(12) United States Patent
Bunger et al.

(10) Patent No.: US 6,374,263 B1
(45) Date of Patent: Apr. 16, 2002

(54) SYSTEM FOR MAINTAINING PRECOMPUTED VIEWS

(75) Inventors: Craig J. Bunger, San Francisco; Latha S. Colby, Mountain View; Richard L. Cole, Los Gatos; Galt Johnson, San Francisco; William J. McKenna, Santa Cruz; Gopal B. Mulagund, San Jose; David G. Wilhite, Jr., Santa Clara, all of CA (US)

(73) Assignee: International Business Machines Corp., Armonk, NY (US)

( * ) Notice: Subject to any disclaimer, the term of this patent is extended or adjusted under 35 U.S.C. 154(b) by 0 days.

(21) Appl. No.: 09/356,486

(22) Filed: Jul. 19, 1999

(51) Int. Cl.$^7$ .............................................. G06F 17/30
(52) U.S. Cl. .............................. 707/201; 707/2; 707/3; 707/8; 707/10; 707/203; 709/203; 709/219
(58) Field of Search ............................. 707/8, 9, 10, 3, 707/2, 201, 203; 709/203, 219

(56) References Cited

U.S. PATENT DOCUMENTS

| | | | | | |
|---|---|---|---|---|---|
| 5,276,870 | A | * | 1/1994 | Shan et al. | 707/2 |
| 5,495,605 | A | * | 2/1996 | Cadot | 707/4 |
| 5,581,753 | A | * | 12/1996 | Terry et al. | 707/201 |
| 5,963,959 | A | * | 10/1999 | Sun et al. | 707/200 |
| 5,999,926 | A | * | 12/1999 | Suciu | 707/5 |
| 6,006,216 | A | * | 12/1999 | Griffin et al. | 707/2 |
| 6,026,390 | A | * | 2/2000 | Ross et al. | 707/2 |
| 6,178,519 | B1 | * | 1/2001 | Tucker | 714/4 |

* cited by examiner

Primary Examiner—Jean R. Homere
(74) Attorney, Agent, or Firm—Fish & Richardson PC

(57) ABSTRACT

A system and a method maintain a precomputed view corresponding to detail data in a database server by: determining a maintenance plan to refresh the precomputed view when detail data is changed; integrating the maintenance plan with a query execution plan in the database server; and executing the query execution plan.

18 Claims, 15 Drawing Sheets

Product

| prod ID | product type | ... | bar code | ... |
|---|---|---|---|---|
| 1 | cereal x | . | | |
| 2 | toy y | . | | |
| 3 | paint z | . | | |

*FIG. 1A*

Sales

| time key | prod ID | dollars | ... |
|---|---|---|---|
| 1/1/98-12:00 | 1 | 10 | |
| 1/1/98-12:01 | 1 | 13 | |
| 1/2/98-13:07 | 2 | 18 | |
| 1/2/98-14:02 | 3 | 7 | |

*FIG. 1B*

Time

| time key | day | month | year | ... |
|---|---|---|---|---|
| 1/1/98-12:00 | 1/1/98 | 1/98 | 98 | |
| 1/1/98-12:01 | 1/1/98 | 1/98 | 98 | |
| 1/1/98-12:02 | 1/1/98 | 1/98 | 98 | |
| ⋮ | ⋮ | ⋮ | ⋮ | |
| 2/1/98-12:00 | 2/1/98 | 2/98 | 98 | |
| 2/1/98-12:01 | 2/1/98 | 2/98 | 98 | |

*FIG. 1C*

Precomputed

| day | prod ID | sum_dollars |
|---|---|---|
| 1/1/98 | 1 | 23 |
| 1/2/98 | 2 | 18 |
| 1/2/98 | 3 | 7 |

*FIG. 1D*

| type | $\Delta^{old}G$ | | $\Delta^{new}G$ | | MV | |
|---|---|---|---|---|---|---|
| | A | min(B) | A | min(B) | A | min(B) |
| u | a1 | 3 | a1 | 2 | a1 | 3 |
|   | a2 | 4 | a2 | 5 | a2 | 3 |
| r | a3 | 5 |   |   | a3 | 5 |
|   | a4 | 6 |   |   | a4 | 3 |
| r | a5 | 10 | a5 | 15 | a5 | 10 |
| i |   |   | a6 | 8 |   |   |
| u | a7 | 4 | a7 | 1 | a7 | 2 |
| u |   |   | a8 | 2 | a8 | 5 |
|   |   |   |   |   |   |   |

Table 1: Classifying deltas for updates:
1) u–update group in MV,
2) r–recompute group and delete or update MV, and
3) i–insert group in MV.

SYSTEM FOR MAINTAINING PRECOMPUTED VIEWS

BACKGROUND

This application relates to processing and maintaining precomputed views in a database.

A database is a collection of data, usually pertaining to a well defined purpose. The data typically has a known format which is defined by metadata. The data in a database is typically stored, retrieved, and modified by a database management system. A relational database management system (RDBMS) stores information in tables, in rows and columns of data, and conducts searches. The rows of an RDBMS table typically represent records (collections of information about separate items) and the columns typically represent fields (particular attributes of a record). A relational database management system may respond to user queries on the database by matching information from a field in one table with information in a corresponding field of another table, and producing a third table that combines data from both tables. Users typically query, update and manage the RDBMS using a data sublanguage (e.g., SQL). A data sublanguage is one that may be used in association with another computer language for the specialized purpose of accessing data. There are many relational data sublanguages, including QUEL from Relational Technology, Inc. (ASK/Ingres), and RDML from Digital Equipment Corporation. SQL has been formally standardized for access to relational databases and is widely implemented and used, although there are many variations of SQL (e.g., RISQLÖ from Informix Software, Inc. of Menlo Park, Calif.).

In the relational database model, a relation can be represented by a table. A relation is typically made up of one or more attributes (represented as columns in SQL), each of which is associated with a data type (e.g., a character string, an integer, or a floating point number). Data typically is stored in a table in tuples (rows in SQL).

Referring to FIGS. 1A–1D, the relational database tables Product, Sales, Time and Result contain columns of attributes and rows of data related to those attributes. For example, the Product table of FIG. 1A, includes prod ID, product type, and bar code. Specific operations can be performed on these tables. One such operation is selection, which identifies a specific row or rows in a table. Selection is typically done by specifying one or more predicates that are used to filter a table to identify rows for which the predicate is true. Predicates are typically found in the WHERE clause of an SQL query. For example, a selection operation could request the selection of prod ID of 1, which would select the first row of the Product table. Another operation in the relational database model is called the join. A join operation is a way of combining data from two tables which is typically based on the relationships between the data in those tables. The Product table identifies the product type by prod ID, and the Sales table identifies the amount of dollars associated with each prod ID/time (time key) combination. The Product table and the Sales table may be joined through their prod ID columns. The Sales table also associates a time key with each row, and the Time table relates a day with each time key. Accordingly, the Sales table and the Time table may be joined through the time key values.

FIG. 2 shows relationships between a fact table and its dimension tables. Fact tables and dimension tables are a subset of detail tables. Fact tables are detail tables which record events (e.g., a sales event). The tables in which information related to the sales event (e.g., a time, a store, and a product) is stored are the dimension tables of the associated fact table. For example, Time table, Store table, and Product table are the dimension tables associated with the Sales table. The Class outboard (dimension of a dimension) table eliminates redundancies. This feature is referred to as normalization.

Another concept in relational database models is functional dependency. A functional dependency is a many-to-one relationship between columns of values in database tables. A functional dependency from column x to column y is a constraint that requires two rows to have the same value for the y column if they have the same value for the x column. A functional dependency may be explicitly declared by a user, such as the database administrator.

Further, relational database models provide for an aggregation query, which is a query that requires the summarization or consolidation of rows in database tables, typically using a set function, such as SUM or COUNT, and an optional GROUP BY clause. An aggregate table is typically a L table that summarizes or consolidates detail level records from other database tables.

SQL enables users to define a virtual table (a "view") and to save that definition in a database as metadata. A view usually is not physically materialized (or "precomputed") until it is needed (e.g., when a SQL statement references the view). The metadata about the view can include information such as the name of the view, the names and data types of each column and the SQL text describing the data the view produces. The metadata about the view is typically stored in the database's metadata, but the actual data that the user will see in the view are typically not physically stored. Rather the data typically are stored in detail tables from which the view's rows are derived. In the case of a precomputed view, data typically is stored in an associated precomputed table. In general, operations can be performed against views just as they can be performed against detail tables.

A user may request information such as how many units of cereal X were sold on Jan. 1, 1999. The result of that query may be derived from the Product table (FIG. 1A), the Sales table (FIG. 1B), and the Time table (FIG. 1C). However, deriving the answers to each question from various tables can be highly inefficient and time consuming. In order to increase efficiency, a database administrator may predict questions which are most likely to be asked and precompute a table which includes the answers to these likely questions prior to these questions actually being asked. For example, a store's database administrator may determine that a frequently asked question is the total sum of sales of a given product over a period of one day (sum_dollars). Accordingly, the database administrator may create one or more precomputed tables (FIG. 1D) and a precomputed view associated with that table.

These precomputed tables need to be maintained to ensure that the precomputed tables store current data. When changes are made to detail tables, the precomputed view can become "out-of-sync" with the detail data. The maintenance of a large number of precomputed tables is time consuming and requires an administrator to invest time updating the precomputed view. When a query is asked and the answer is not directly available from a stale precomputed table, the answer to such a query typically is to execute the query from one or more detail tables, a process which may be highly time consuming and computationally intensive.

SUMMARY

The invention provides automatic maintenance of precomputed views. The invention maintains a precomputed view corresponding to detail data in a database server by: determining a maintenance plan to refresh the precomputed view when detail data is changed; integrating the maintenance plan with a query execution plan in the database server; and executing the query execution plan.

The precomputed view can be maintained either incrementally using the changes to detail data or by recomputing the view directly from detail data or other precomputed views.

Advantages of the invention include one or more of the following. The maintenance process is performed in a transparent, comprehensive, efficient and robust manner. Views are maintained automatically within the same transaction that changes detail data. Users are completely insulated from the maintenance process and do not have to write special scripts or schedule jobs for maintaining views.

Further, the maintenance process is comprehensive: All supported precomputed views are automatically maintained when detail data changes. The maintenance is supported for both server-based and loader-based inserts, deletes, and updates and with any interface that changes data. Options are available for turning off automatic maintenance for all and individual views. Further, users can use a rebuild facility to rebuild the views from detail data at a later point in time.

The view maintenance system is efficiently integrated with a warehouse server and allows increases the scope for optimizing the maintenance strategies. The invention also leverages many existing loading and efficient query processing techniques in the system. The maintenance system uses the capabilities of a rewriter in determining dependency information among views. This dependency information is used in determining the correct maintenance strategy including sequencing and parallelizing maintenance of multiple views. The system also uses foreign-key/primary-key relationships, hierarchy information, nullability of columns and other metadata to produce more efficient maintenance plans.

Yet another advantage is the system's robustness. The view maintenance system is designed to maintain data integrity. For example, any detail data modifications that fail referential integrity or uniqueness constraints will not be propagated to precomputed views. The system can mark any views for which maintenance did not succeed as invalid, thus ensuring correctness of query results.

Other features and advantages will become apparent from the following description, including the drawings and the claims.

BRIEF DESCRIPTION OF THE DRAWINGS

FIGS. 1A–1D are diagrammatic views of a Product table, a Sales table, a Time table and a Precomputed table, respectively.

DETAILED DESCRIPTION

I. Overview

A. General Features of a System and Method of Maintaining Precomputed Views

Figure 2:
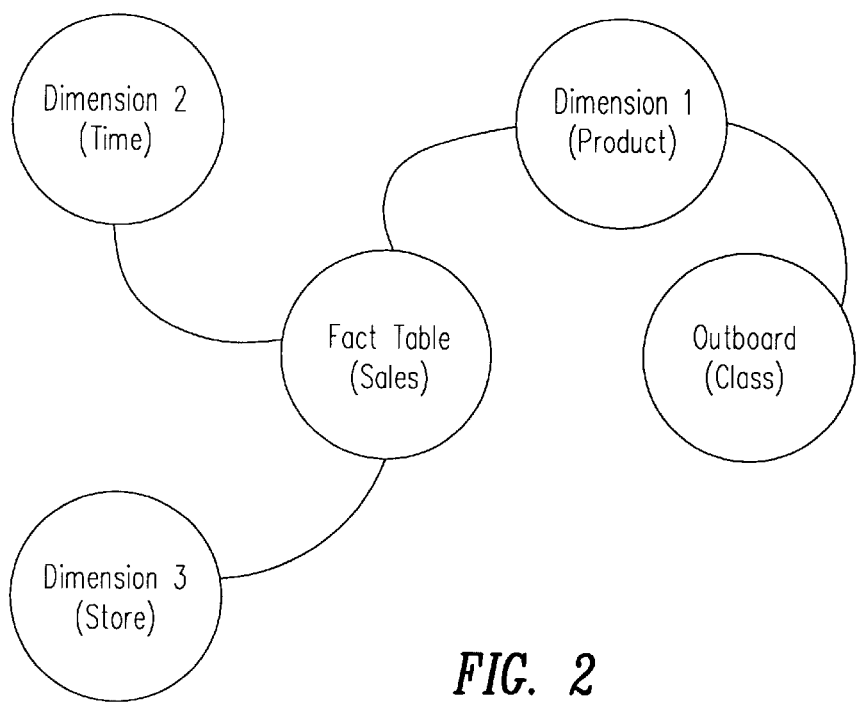
FIG. 2 is a diagrammatic view of a Fact table and its associated dimensions.
Figure 3A:
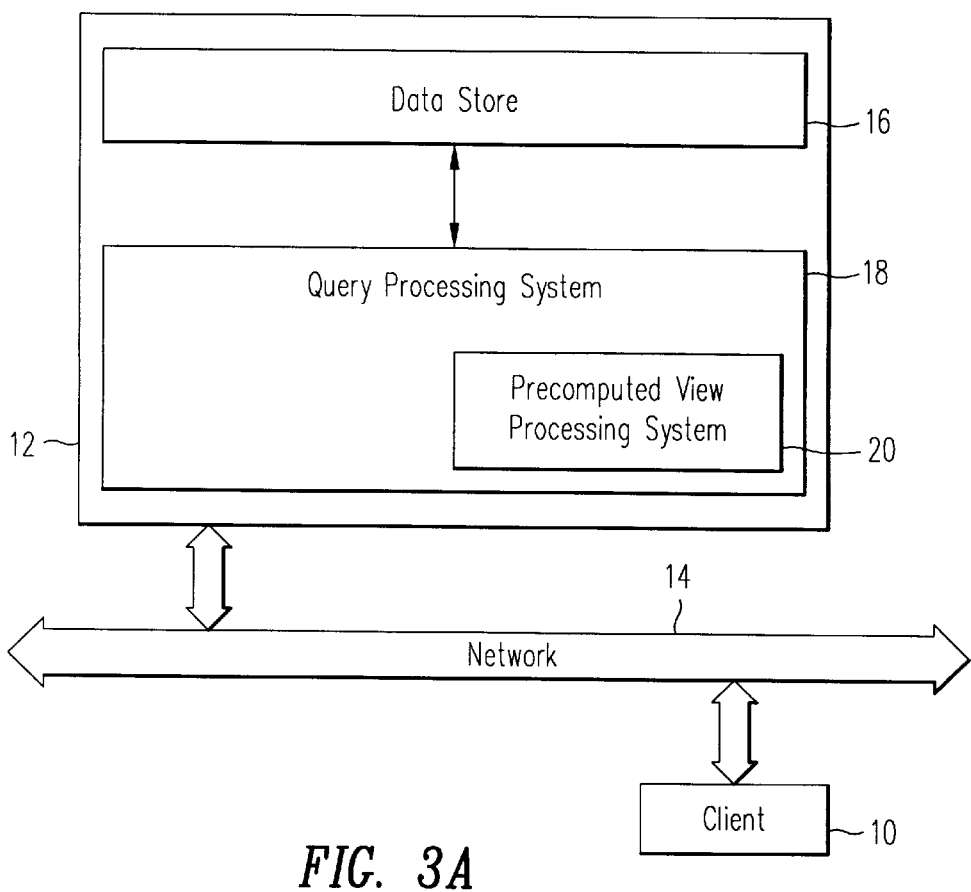
FIG. 3A is a diagrammatic view of a client coupled to a database server over a network.

Referring to FIG. 3A, in one embodiment, a client 10 may send queries to a database server 12 over a network 14 to access data contained in a data store 16 (e.g., a data warehouse such as the Red Brick Warehouse available from Informix Software, Inc. of Menlo Park, Calif.). Database server 12 includes a query processing system 18 which, in turn, includes a precomputed view processing system 20. Query processing system 18 receives queries from client 10 over network 14 and, with the support of precomputed view processing system 20, executes the received queries by returning to client 10 data from data store 16 that corresponds to the requested information. Precomputed view processing system 20 provides a systematic approach to precomputing aggregate data for decision-support queries. Before each query is executed, precomputed view processing system 20 performs a cost-based analysis to determine whether the query should be intercepted and rewritten to improve query performance. In addition, precomputed view processing system 20 logs statistics about query execution to enable database administrators to determine how efficiently the existing aggregation strategy is working and to determine how to improve the current aggregation strategy.

In decision support environments, a standard model of data is that of facts associated with points in a dimension space. In a retailing environment, for example, each sale occurs at a particular time, in a particular store, and is of a particular product. In this example, each sales event is a fact and occurs at a point in the three-dimensional space (product, store, time). Each dimension usually forms a hierarchy: product may be a two-level hierarchy, for example, with product-type at the finest level of granularity and product-category at the coarsest level. Multi-dimensional data models distinguish between points in dimensions (e.g., product-type) and attributes of these points (e.g., product-color). Aggregates typically are computed on points in the dimension space, possibly with constraints placed on dimensional attributes.

Aggregate processing in relational databases typically involves retrieving qualifying fact records based upon dimensional constraints, grouping the records by values for points in specified dimensions, and applying aggregate functions to each group. Even with a highly efficient query processing system, aggregate queries requiring billions of fact and associated dimension records often will be very expensive to compute. Precomputation often results in dramatic performance gains in aggregate processing, and aggregate results at one level of granularity often can be used to compute (rollup) aggregates at coarser granularities. This eliminates the need to precompute all possible aggregates.

As explained in detail below, precomputed view processing system 20 includes a query rewrite system (Rewriter), a query logging and analysis facility (Advisor), and an enhanced meta data facility (Meta Data Layer). The Rewriter intercepts and attempts to rewrite user database queries using aggregate tables; the Rewriter rewrites queries transparently to client applications and end users. The Advisor may be queried for advice on the size and relative benefits of existing aggregate tables and potential (candidate) aggregate tables that would be useful to create. The Meta Data Layer stores information about database objects and their relationships.

In the system of FIG. 3A, a view defines a client query on data store. A precomputed view defines a query and is linked to a precomputed table, which is a database table that contains the precomputed results of the query. In other words, a query defined in a precomputed view is computed before the query is received by query processing system. In contrast, the results for a query defined by a regular view, including candidate views which are generated by the Advisor, should be computed every time the regular view is referenced. In operation, a query defined in a precomputed view may be precomputed automatically; otherwise, the database administrator should populate the associated precomputed table. The database administrator may populate the table using, for example, a Table Management Utility (TMU) LOAD DATA operation or an SQL "INSERT INTO . . . SELECT" statement. The administrator may then create an associated precomputed view that contains a query expression which reflects the contents of the precomputed table. Once defined, query processing system may automatically update precomputed tables to reflect changes in detail tables and may also rewrite user queries to use precomputed views (and their associated precomputed tables).

An aggregate table is a precomputed table that stores the results of an "aggregate query" defined in an associated precomputed aggregate view, which defines the aggregate relationship between the aggregate table and an underlying set of detail tables. The precomputed view definition establishes the semantic link between detail tables and the aggregate table containing the precomputed results. In general, aggregate tables contain information that has a coarser granularity (i.e., fewer rows) than the information contained in detail tables. For example, in a retail database, the transaction-level data might be in the form of individual sales receipts stored in a Sales_Receipts detail table. The records in the Sales_Receipts table may be aggregated over certain time periods to produce a set of aggregate tables (e.g., a Sales_Daily table and a Sales_Monthly table).

An aggregate query typically uses a standard SQL function, such as SUM or COUNT, to aggregate factual data (e.g., sales totals over given periods of time) contained in detail tables. Other aggregation queries use a GROUP BY clause to select distinct rows of dimension data from a large dimension table (e.g., distinct combinations of quarters and years or districts and regions). In these ways, aggregation queries "roll up" rows of data of fine granularity into groups of rows of coarser granularity. The performance gain offered by the query rewrite system derives from the precomputation of these rollups. Additional performance gains are achieved by the ability of the query rewrite system to rewrite queries that require additional rollups, involving columns of a granularity that is coarser than the grouping columns of the view. In other words, the query rewrite system may be used to rewrite a large number of queries that do not match the query defined in the view. For example, the view might define a query that returns rows grouped by a Month column, yet this view may be used to rewrite queries grouped by the Qtr and Year columns, despite the fact that neither of these columns is named in the query defined by the view. This rollup capability frees a database administrator from having to create three separate views, grouped by Month, Qtr and Year, respectively, or one very wide view grouped by all three columns.

Hierarchies (i.e., functional dependencies), which are inherent in warehouse data, enable rollups to columns which are not defined in precomputed views. A hierarchy is a many-to-one relationship shared by columns of values. In other words, a hierarchy from column X to column Y is a constraint that requires two rows to have the same value for the Y column if they have the same value for the X column. The columns may be in the same table or in different tables. For example, if a hierarchy exists between the Store_Number and City columns in a Store table, whenever the value in the Store_Number column is Store#56, the value in the City column is Los Angeles. This relationship is many-to-one because there could be many stores in a city, but a given store can only be in one city. Similarly, the City column in the Store table may have a many-to-one relationship with a Region column in the Market table (e.g., if the city is Los Angeles, the region is always West).

Hierarchies allow precomputed views that are grouped by columns of finer granularity to be used to rewrite queries grouped by columns of coarser granularity. For example, the existence of a Store_Number-to-City hierarchy allows the Store_Number values to be grouped into distinct City values. If a precomputed view is grouped by Store_Number, it is not necessary to create another view grouped by City because the same view may be used to rewrite queries that constrain on one or both of these columns. The query rewrite system uses hierarchies intelligently to rewrite queries that require a rollup beyond the scope of the precomputed view definition.

There are two types of hierarchies: those implicitly known to the query processing system, and those that should be explicitly declared by the database administrator. Hierarchies that follow the path of a primary key/foreign key relationship or result from non-nullable unique column definitions are implicitly known to the query processing system. As a result, a view grouped by, for example, the Sales.Perkey column, where Perkey is a foreign key column that references, for example, the Period table, automatically may be used to rewrite queries grouped by any combination of columns in the Period table. This feature also applies to queries grouped by columns in outboard tables (i.e., tables referenced by dimension tables). For example, a view grouped by the Sales.Storekey column, where Storekey is a foreign key column that references the Store table and Store.Mktkey is a foreign key column that references the Market table, automatically may be used to rewrite queries that group by any combination of columns in the Store and Market tables.

Other hierarchies should be explicitly declared. For example, if a view is grouped by the Month column in the Period table and dependencies exist from Month to Qtr and from Qtr to Year, both dependencies need to be declared. After they have been declared, the query rewrite system may use the same precomputed view to rewrite queries grouped by any combination of the three columns. Declaring these dependencies also improves the performance of the Advisor. The mechanism for declaring a hierarchy is the CREATE HIERARCHY command. A CREATE HIERARCHY statement names pairs of columns that satisfy functional dependencies and identify the tables to which the columns belong.

B. Automatic Aggregate Maintenance

An aggregate can be maintained either "incrementally" using the changes to the detail data or by recomputing the aggregate from the detail data. Incremental maintenance can be fast for some types of aggregates and operations and more time-consuming for others. Thus, an option is provided to disable automatic maintenance. If such option is selected, a "reorg facility" can subsequently be used to rebuild the aggregates from the detail data. Changes to detail data can be through server operations or loader operations. The loader, which is a special tool for loading large quantities of data rapidly, uses the capabilities of the server to maintain views when detail data is changed through the loader and the server, in turn, uses capabilities of the loader (such as high-speed export) for view maintenance.

All aggregates derived from a detail table can be maintained immediately (as part of the transaction that updates the detail table) or in a separate transaction (after the commit of the transaction that updates the detail table). In the case of immediate maintenance, the update to the detail tables and the aggregate tables is considered a single atomic transaction. If the update to the detail table succeeds but an update to one of the aggregate tables fails, the entire transaction can be rolled-back or the aggregate can be marked as invalid. In the case of deferred view maintenance, aggregate tables can be inconsistent between the commit of the detail-table update transaction and that of the aggregate-table update transaction. In order to support deferred view maintenance, enough information can be stored in logs to be able to compute the state of the tables before the earliest update that did not maintain aggregates.

As discussed below, aggregates can be automatically maintained in response to detail table changes. In certain cases, aggregates can be marked invalid if the changes could potentially make the aggregates "out of sync" with the detail tables. Aggregates can be automatically maintained when rows are directly inserted into, deleted from or updated in the fact table. These changes can be caused either from server operations or from loader operations. The operation of the automatic maintenance feature during various operations are discussed in more detail below:

1. View Maintenance During Row Insert Operations

When rows are inserted into a table (through a server insert or through a load operation) aggregates that have that table as the fact table are automatically maintained. The aggregates that have a different table as a fact table do not need to be maintained.

2. View Maintenance During Row Delete Operations

When rows are deleted from the fact table of an aggregate, the aggregate can be automatically maintained. For example, the aggregate table store_qtr_sales can be maintained when rows are deleted directly from the sales table. When rows are deleted from the period table the derived dimension qtr_year_dim can be maintained as long as the delete from period is not a cascaded delete (and this maintenance operation on qtr_year_dim will not cascade into store_qtr_sales). If the delete from period is not a cascaded delete, then store_qtr_sales does not have to be maintained.

Any aggregate tables directly referencing a dimension (or derived dimension) table from which a cascaded delete is performed, can have deletes cascaded through deletes of any referenced rows. For example, performing a cascaded delete on the store table can cause any referencing rows to be deleted from sales and store_qtr_sales through the regular cascaded delete operation but no automatic maintenance of any other aggregates can be performed. So, the aggregate num_stores_in_reg can be marked invalid.

3. View Maintenance During Row Update Operations

When rows in a table are updated, automatic maintenance are performed for all aggregates for which the updated table is the fact table. The types of operations that can cause the changes listed above include:

In the Server

1. Insert statements
   2. Delete statements
   3. Update statements
   4. Alter segment detach
   5. Alter segment clear In the Loader 1. Load Append
   2. Load Insert
   3. Load Replace
   4. Load Modify
   5. Load Update All maintenance of aggregates are performed in an immediate mode. For server-based insert/delete/update commands, this means that the execution plan for a modification operation that necessitates aggregate maintenance contains the subplan for the original operation as well as the plans for the maintenance of each aggregate. To facilitate code-reuse between the loader and the server, loader operations necessitating maintenance call the server for the maintenance portion of the load operation. An aggregate can be maintained in one of four different ways: 1) by computing the incremental changes to the aggregate from the incremental changes to the detail table, 2) by recomputing the aggregate from the detail table, 3) by computing the incremental changes to the aggregate from the incremental changes to a parent aggregate, or 4) by recomputing the aggregate in terms of a parent aggregate. In each case the aggregate can be maintained either from the changes to the parent (where a parent is either the detail table or an aggregate) or by recomputation.

Figure 3B:
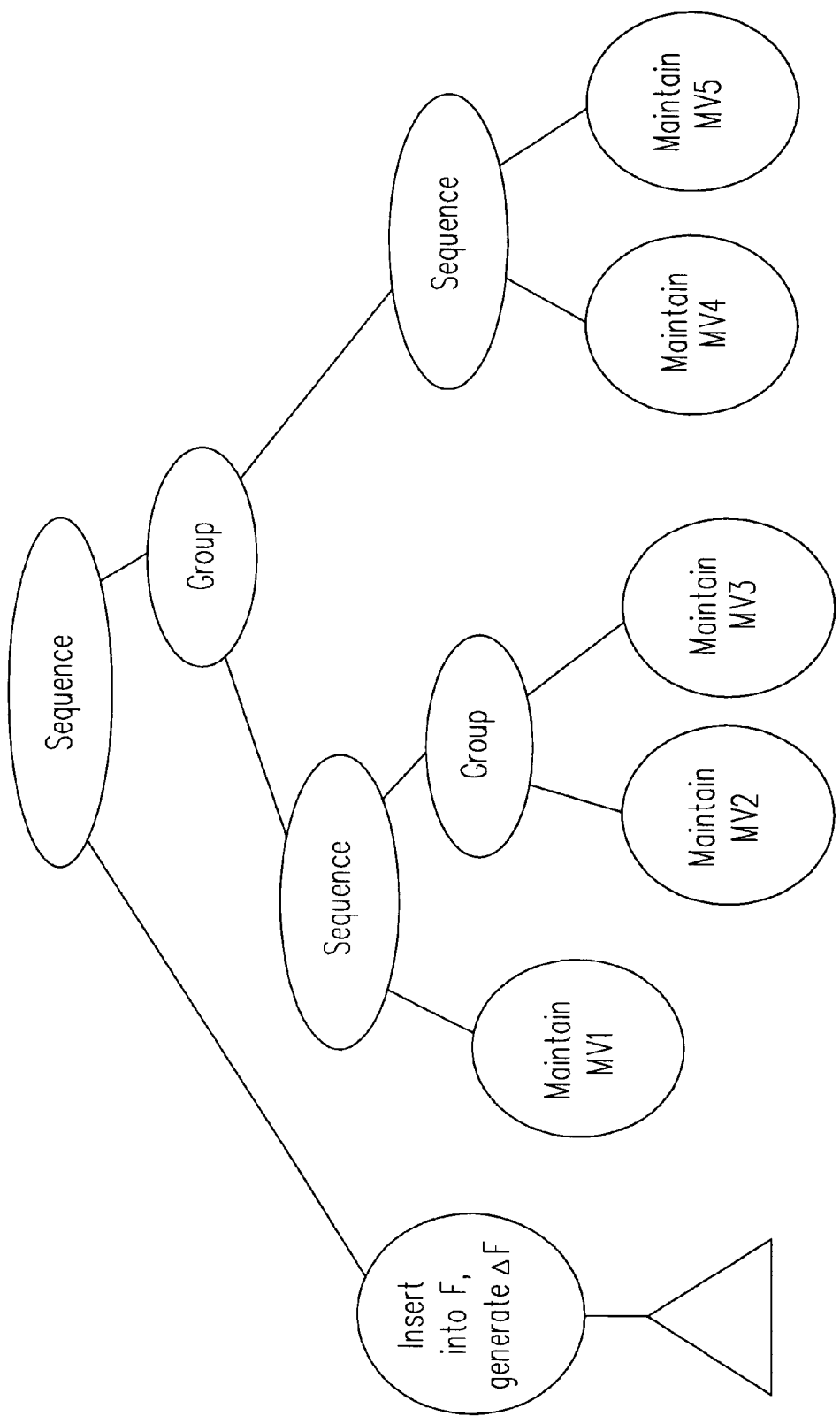
FIG. 3B is a diagrammatic view of a depth first cascaded maintenance process.

FIG. 3B shows an example view dependency graph where MV1, MV2, MV3, MV4 and MV5 are all precomputed aggregates whose original view definition is specified in terms of a detail table F (and possibly, dimension and outboard tables). In the example of FIG. 3, MV2 and MV3 could be derived from MV1 and MV5 could be derived from MV4.

One possible maintenance scheme is to maintain all the aggregates (MV1–MV5) in some arbitrary sequence, after F has been modified, using the changes to F. The maintenance sequence can be derived from the dependency graph if cascaded maintenance (where an aggregate is maintained from a parent aggregate—either incrementally or through recomputation) is supported.

Figure 4:
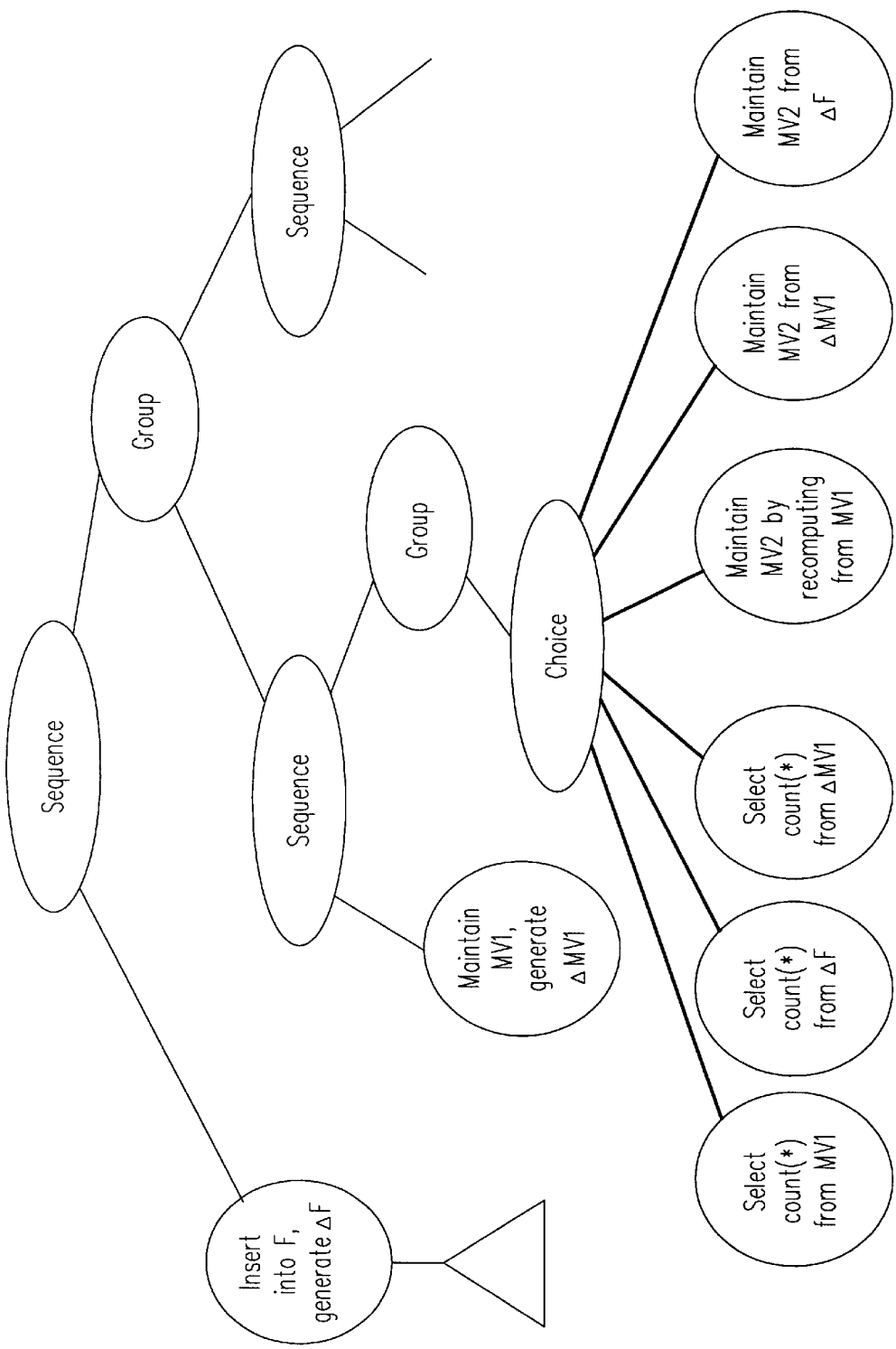
FIG. 4 is a diagrammatic view of a cascaded maintenance process with dynamic choices.
Figure 5:
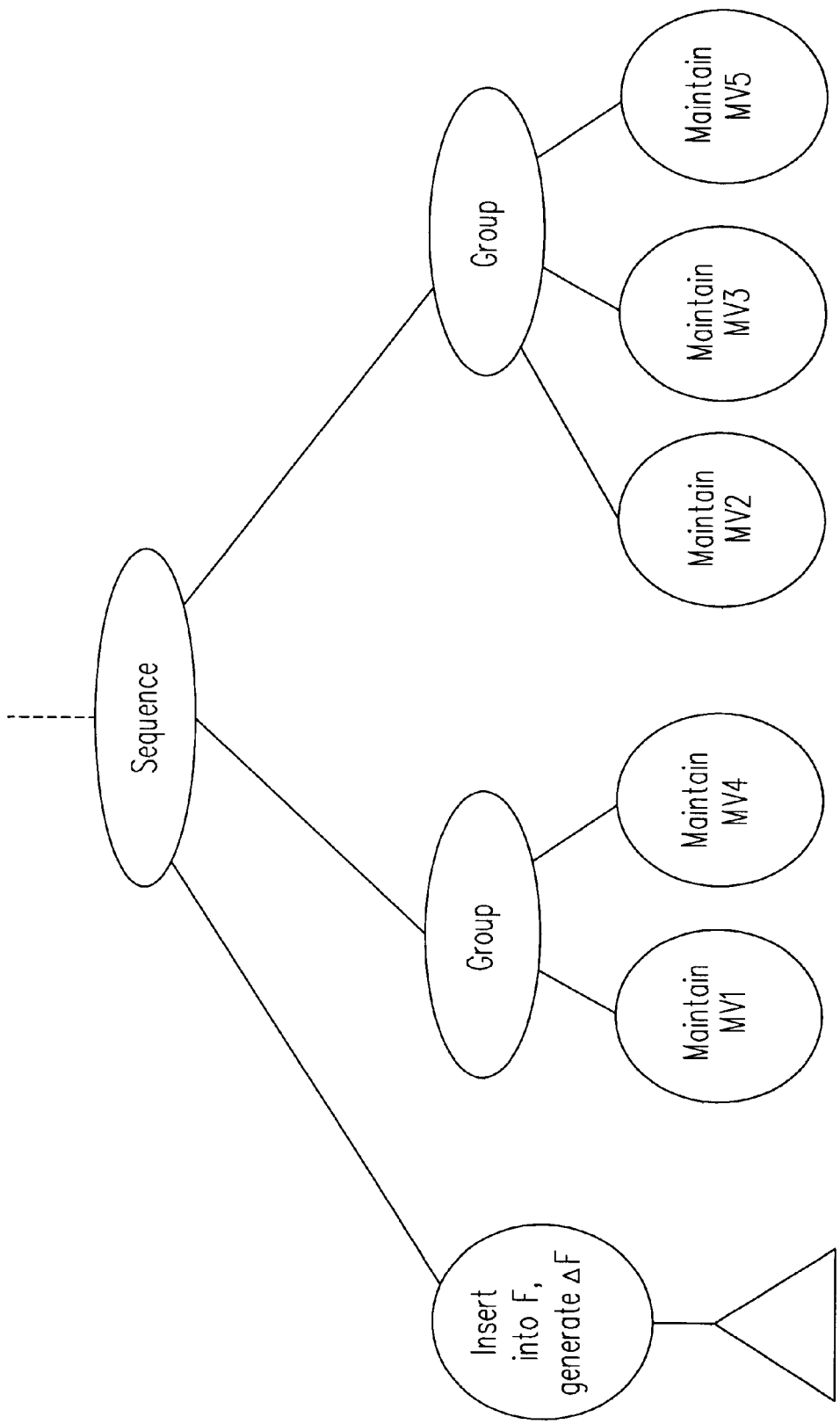
FIG. 5 is a diagrammatic view of a breadth first cascaded maintenance process.

FIG. 3C shows a possible maintenance scenario using a depth-first traversal of the dependency tree. In FIG. 3, $\Delta F$ represents a set of changes to a detail table F and $\Delta MV1$ represents a set of changes to a precomputed view MV1. FIG. 4 shows various alternatives of maintaining MV2 at run time (from $\Delta F$, $\Delta MV1$, or recomputing from MV1). FIG. 5 shows a breadth-first approach. The sequence node represents a sequencing operator where all the children are executed left to right. It can be implemented as a choose plan operator with the first n−1 children being prelimary options and the last child being the choice. The group node represents a similar operator but one whose children can be executed in any arbitrary order (or in parallel). The choice operator is a choose-plan operator representing a set of dynamic choices based on a set of preliminary factors.

The computation of changes to MV2 from ΔMV1 can be complex as ΔMV1 can contain both updates and inserts to MV1 even though ΔF only contains inserts. ΔMV2 can then contain inserts, deletes and updates. Since the type of operations in ΔMV2 isn't known until run time, the system could either assume a worst case scenario and produces a plan that is based on having both inserts and updates in ΔMV1 and all three operations in ΔMV2. Alternatively, it can produce different plans and use dynamic choose plan to pick the appropriate plan. If the latter approach is used, the system avoids options with a combinatorial explosion of plans (e.g. ΔMV2 has inserts only, or updates only, or both; if ΔMV2 has inserts then ΔMV3 can have both inserts and updates, if ΔMV2 has only updates then ΔMV3 can have inserts only, or inserts and deletes).

When a server-based insert/delete/update is performed, the system will first identify if maintenance is necessary for any precomputed aggregates and construct a list of all the ones that need to be maintained. A maintenance plan (starting with an LAE or a Query Rep) can be generated that contains the plan for the user query and the plans for maintaining aggregates.

Alter segment clear commands are server commands which initiate aggregate maintenance. A delta access layer is used to hide the underlying storage mechanism from the consumer of the delta files. The loader can invoke the server (as a separate process within the same transaction) to perform aggregate maintenance. In an embodiment, the server can run in a special mode so locks could be inherited from the loader. The loader can also communicate transaction information (i.e., the transaction handle) to the server. The loader communicates information about files (e.g., delta files), segments, among others, to the server through a loader-server interface.

A reorganization plan is then derived from the dependency graph. Each aggregate is rebuilt by executing its view definition query (possibly rewritten to use another aggregate) and inserting the result into the aggregate table.

1. Insert into F: $\Delta^+F$

Compute $\Delta^+F$ join D1 join D2 join O2=$\Delta^+J$ $\Delta^+J$ is a set of rows that are the 'translated' rows of $\Delta^+F$, i.e., the appropriate groups are determined for the $\Delta^+F$ rows, along with the relevant aggregation values. The cardinality of $\Delta^+J$ $|\Delta^{\Delta+}J|$ is $|\Delta^+F|$.

Compute $\text{Agg}_{mv}(\Delta^+J)=\Delta^+G$.

$\Delta^+G$ represents the aggregation of $\Delta^+F$ as defined by the view definition of MV. Here, $|\Delta^+G|<=|\Delta^+F|$.

Compute $\Delta_1^+G$ where $\Delta_1^+G$ contains rows in $\Delta^+G$ that aren't in MV This is done by outerjoining $\Delta^+G$ to MV on grouping columns and selecting the rows that did not join with MV (based on null values for MV.rowid).

Compute $\Delta_2^+G$, the complement of $\Delta_1^+G$, i.e., the rows in $\Delta^+G$ that did join with MV.

Insert $\Delta_1^+G$ into MV.

Apply ($\Delta_2^+G$,MV) where apply involves updating the aggregations columns in MV using the corresponding values in $\Delta_2^+G$.

This works for min, max, sum, count(*), and count (simple-expression) aggregation functions. This does not work for count (distinct(simple-expression)) aggregations. For count (distinct(simple-expression)) aggregations, all of the affected group(s) should essentially be recomputed from scratch. Where the aggregate table has extra columns (more columns than the view definition) these columns are filled with a default or NULL value. In order to avoid losing rows with NULL values in the columns participating in joins, NULLEQ comparisons are used. NULLEQ comparisons are also used when comparing aggregation columns.

2. Delete from F: $\Delta^-F$

Compute $\Delta^-F$ join D1 join D2 join O2=$\Delta^-J$ $\Delta^-J$ represents the 'translated' set of rows determined by mapping $\Delta^-F$ rows to their appropriate groups as defined by the view definition of MV. The schema of $\Delta^-J$ should contain at least the grouping columns and aggregation columns, and the physical implementation should also preserve the RowPointer of F in order to simplify later stages of processing).

Compute $\text{Agg}_{mv}(\Delta^-J)=\Delta^-G$.

Case 1: MV contains count(*) and possibly sum( ) and count( ). For each row in $\Delta^-G$, lookup row in MV. If count(*) value is the same in both, delete the row from MV, else decrement the count(*) and count values in MV by those in $\Delta^-G$ and subtract the sum value in MV by the sum value in $\Delta^-G$.

Case 2: MV contains sumo but no count(*), or contains min( ) or max( ). Assume MV does not contain count (distinct).

Compute $\Delta^-_2 G$=rows in $\Delta G$ that have the same value for any aggregation column as that in the corresponding rows (according to grouping columns) in Mv.

Compute $\Delta^-_1G=\Delta^-G-\Delta^-_2G$.

$\Delta^-_1G$ contains rows with aggregation values that can be used to update the corresponding rows in MV directly whereas $\Delta^-_2G$ contains rows for groups that may either have to be deleted from MV or that contain aggregation values that need to be recomputed for Mv.

Compute $\Delta^-_2G$ join O2 join D2 join D1 join F=$\Delta^-_2J$ (taking care not to lose rows with NULLs for the group by columns. $\Delta^-_2J$ should have the same schema as $\Delta^-J$).

Compute $\text{Agg}_{MV}(\Delta^-_2J-\Delta^-J)=\Delta^-_{2\alpha}G$ if $\Delta^-F$ hasn't yet been applied when computing $\Delta^-_2J$ above (otherwise compute $\Delta^-_{2\alpha}G=\text{Agg}_{MV}(\Delta^-_2J)$).

$\Delta^-_{2\alpha}G$ represents the recomputed set of groups. Note: $\Delta^-J$ and $\Delta^-_2J$ could contain duplicates, so '−' in the equation above denotes the EXCEPT ALL operation of relational algebra. If the physical implementation preserves the RowPointer of rows in $\Delta^-F$ when computing $\Delta^-J$ and the computation of $\Delta^-_2J$ also notes these RowPointers, then simple difference will suffice.

Compute $\Delta^-_{2\beta}G=\Delta^-_2G-\Delta^-_{2\beta}G$.

$\Delta^-_{2\beta}G$ identifies groups in $\Delta^-G$ that are not in $\Delta^-_{2\alpha}G$ or $\Delta^-_1G$ (or equivalently groups in $\Delta^-_2G$ that are not in $\Delta^-_{2\alpha}G$). These are the groups that no longer exist in MV after $\Delta^-F$ is applied (or, the groups of $\Delta^-_2G$ that had all their rows deleted from F).

Apply ($\Delta^-_1G$, MV) where Apply involves looking up a row from $\Delta^-_1G$ in MV and decrementing, subtracting, or min/max'ing the aggregation values in MVusing the corresponding ones in $\Delta^-_1G$.

Delete ($\Delta^-_{2\beta}G$,MV).

Apply-replace ($\Delta^-_{2\alpha}G$,MV) where Apply-replace involves looking up a row (by grouping columns) from $\Delta^-_{2\alpha}G$ in MV and replacing the aggregation values in MV with those in $\Delta^-_{2\alpha}G$. Alternatively, the following operations can be performed: 1) Apply ($\Delta^-_1G$, MV), 2) Delete ($\Delta^-_2G$,MV), and 3) Insert ($\Delta^-_{2\alpha}G$,MV). In other words, the operation deletes not only the groups that are to be finally deleted from MV but also all the ones that need to be updated with recomputed values and re-insert them (after recomputation). If MV contains count(distinct), then all groups in $\Delta G$ need to be recomputed (i.e., $\Delta^-_1G$ is empty, and $\Delta^-_{2\beta}G$ is empty, and all groups in $\Delta G$ fall into $\Delta^-_{2\alpha}G$).

3. Insert into D1, D2 or O2—No effect on MV.
4. Delete from D1–$\Delta^-$D1.
   Case 1: No cascade—no effect on MV.
   Case 2: Cascade.
   The cascade maintenance can be performed as follows:
   Method 1: This is based on computing the rows to be deleted from F and D1 but actually derferring the application of the updates until after MV is maintained. Compute $\Delta^-F$ rows to be deleted from F, then proceed as in item 2 above using pre-update state of D1 (this requires deferring the deletes from the dimension, and applying incremental maintenance before the deletes occur.
   Method 2: Maintain MV after F and D1 have had the rows deleted. Compute $\Delta^-F$ join $\Delta^-D1$ join D2 join O2=$\Delta^-J$. (Note that the $\Delta^-F$ join $\Delta^-D1$ part from the delete cascade computation may be preserved). From this point onwards, the algorithm is that same as in case 2 above. $\Delta^-_{2\alpha}G=Agg_{MV}(\Delta^-_2J)$ and not $\Delta^-_{2\alpha}G=Agg_{MV}(\Delta^-_2J-\Delta^-J)$ since rows have already been deleted from F. Note that the maintenance algorithm depends on $\Delta^-F$ (and on whether or not these have been applied to F) and doesn't depend on whether or not $\Delta^-D1$ has already been applied to D1 (i.e., the effect of $\Delta^-D1$ is essentially computed in terms of the effect of $\Delta^-F$).
5. Update F—If the update is to a column that is not involved in the view definition, MV does not have to be updated. Suppose that the update is to a column that is involved in the view definition. One way is to treat the updates to F as delete and insert. In the case of a real delete to F, the equations in item 2 above can be applied using either the pre-update or the post-update value for F. However, in the case of an update, the pre-update state of F may not be available to us and the post-update state of F cannot be used for the delete analysis since it contains the result of applying the update to F and not the delete.

If updates are treated as deletes and inserts the delete delta computation needs to "compensate" for the fact that an F that has had updates applied to it and not deletes. In other words, the pre-update state of F, F old, needs to be constructed with an appropriate delete method (the one that uses the pre-update F).

Figure 6:
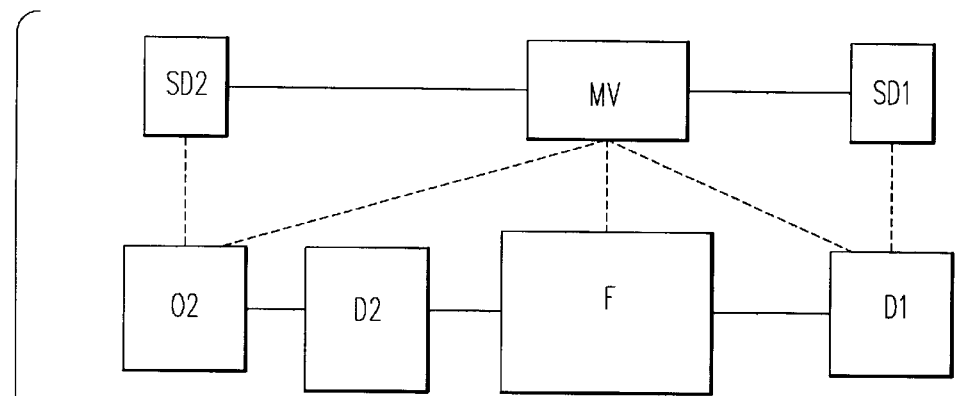
FIG. 6 is a diagrammatic view of an example schema and a Table 1 associated with the example schema.

A second way is to classify the updates into groups that need to be either 1) inserted into MV, 2) modified in MV (without recomputation), and 3) modified/deleted in MV with recomputation. Table 1 of FIG. 6 shows how groups in update deltas can be classified. In this table, $\Delta^{old}F$ and $\Delta^{new}F$ are old and new versions of the rows in F that have been updated. $\Delta^{old}G$ is pre-update updated rows with aggregation applied and $\Delta^{new}G$ is the post-update equivalent. In other words, $\Delta^{old}G$ is computed as $Aggr_{MV}(\Delta^{old}F$ join D1 join D2 join O2) and similarly for $\Delta^{new}G$. In this example, MV has A as the grouping column and contains min(B). The groups in the two deltas can be classified into four sets: (i) those that have to be recomputed by joining back to the detail data (ii) new groups that don't exist in MV, (iii) groups that exist in MV but that can be updated using the information in the two deltas and (iv) groups in MV that do not need to be modified.

Groups in (i) have to be joined to the detail data in order to determine the groups that are to be deleted entirely and new aggregation values for the remaining ones. This part of the computation is the same as the recomputation portion of the delete maintenance algorithm—the part where $\Delta 2G$ is joined to the detail tables and $\Delta^-_{2\alpha}G$ and $\Delta^-_{2\beta}G$ are determined. Groups in $\Delta^-_{2\alpha}G$ contain new aggregation values and can be applied to MV using Apply-replace (conditional update).

Groups in $\Delta^-_{2\beta}G$ are deleted from MV. Groups in (ii), let's call this $\Delta iG$, can be inserted into MV and groups in (iii), say $\Delta_\mu G$, can be used to modify the corresponding groups in MV using aggregation values that are computed from those in the deltas and MV. For example, if the aggregation were a sum and MV were modified using the sum values in the deltas, the difference would be applied between the two sum values to the sum column in MV. There are some optimizations that can be done. For example, if MV contains only count(*), an update to F that does not involve any grouping columns will not affect MV and similarly for count(non-null column).

6. Update D1, D2 or O2

Consider an update to Di and assume that the update is to a column that is not involved in the view definition. In theory, an update to D1 could be treated as a delete followed by an insert. However, the update to D1 should be treated as a cascaded delete from D1, followed by an insert into both F and D1.

Assuming that the update to D1 involves updating $\Delta mD1$ rows in D1, this can be logically treated as the following sequence of operations: 1) delete $\Delta F$ rows from F, 2) delete $\Delta^-D1$ rows from D1, 3) insert $\Delta^+D1$ rows into D1 and 4) insert $\Delta F$ rows into F $\Delta^{old}G$ $\Delta^{new}G$ MV A min (B) A A min (B) min (B) type where $\Delta^-D1$ and $\Delta^+D1$ together constitute the update $\Delta mD1$ and $\Delta F$ is rows in F that join with $\Delta mD1$. This essentially involves computing changes to MV in terms of the deletes to F using the pre-update state of D1 and inserts to F using the post-update state of D1. Again, since the pre-update state of D1 may not be available to us, the values for all the affected groups can be recomputed.

The maintenance plans are discussed next. These plans are essentially optimized versions of the methods described above. The main optimizations are to allow insert/delete/update operators to flow-up rows that can be used by the parent operator in order to avoid either recomputing common sub-plans or materializing results of common sub-plans. As an example, in the case of delete maintenance, $\Delta^-_2G$, which contains the rows in $\Delta^-G$ corresponding to groups that might need recomputation, is joined back to the detail tables (for the recomputation) and is also used to identify the rows in $\Delta^-G$ that don't need recomputation using the equation $\Delta^-_1G=\Delta^-G-\Delta^-_2G$. In order to avoid computing $\Delta^-_2G$ twice (or materializing it), the sub-plan that consumes $\Delta^-_1G$ pass up $\Delta^-_2G$ to the rest of the plan performs the recomputation.

The new logical operators needed for maintenance are 1) sequence, 2) group, 3) choice, 4) conditional insert, 5) conditional delete, and 6) conditional update. The first three were described earlier. The next three are variants of regular insert/delete/update that use a condition to identify the subset of the input that is used in the modification. At the PAE level, the sequence operator can be implemented using the general choose-plan where the first n−1 children constitute the set of prelims and the last one the choice so that all the children are, in effect, executed sequentially. The choice operator is the choose-plan operator. A choice operator at the logical algebra level is needed because the LAE should contain the plans for all Lsi the alternative ways of computing MV. The actual selection of the plan is delayed until run-time.

Figure 7:
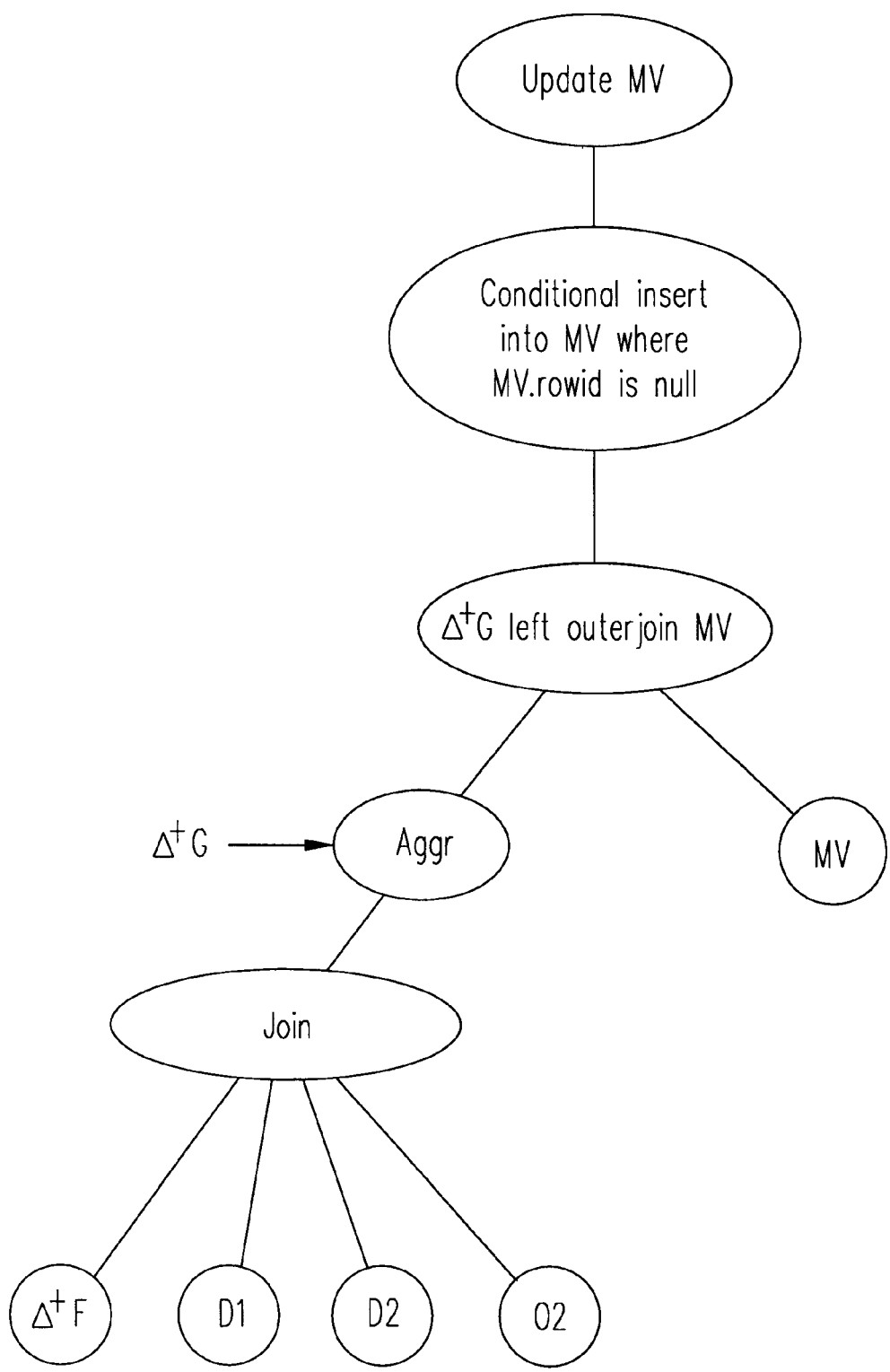
FIG. 7 is a diagrammatic view of an insert maintenance plan.
Figure 8A:
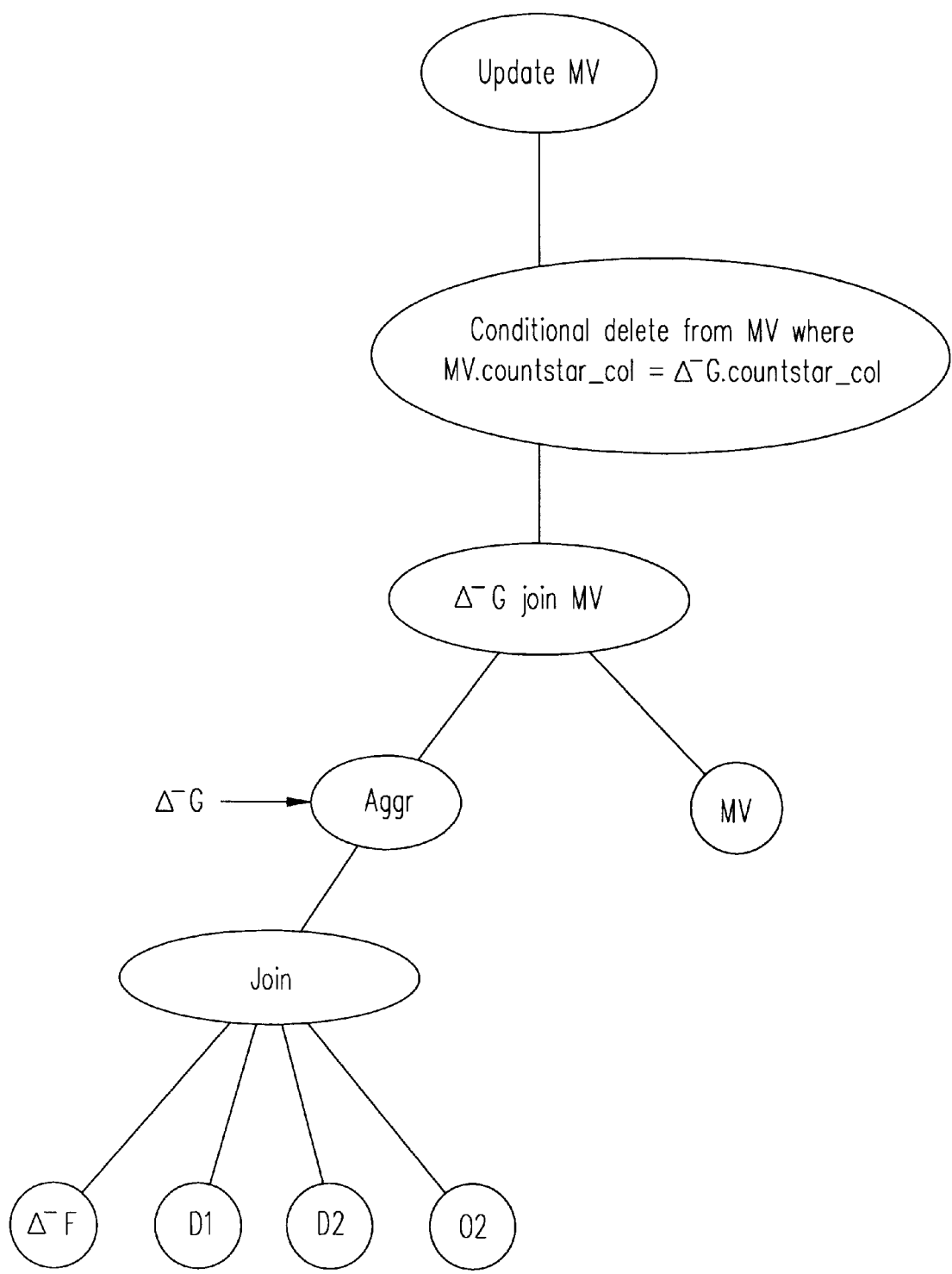
FIG. 8a is a diagrammatic view of a first delete maintenance plan.
Figure 8B:
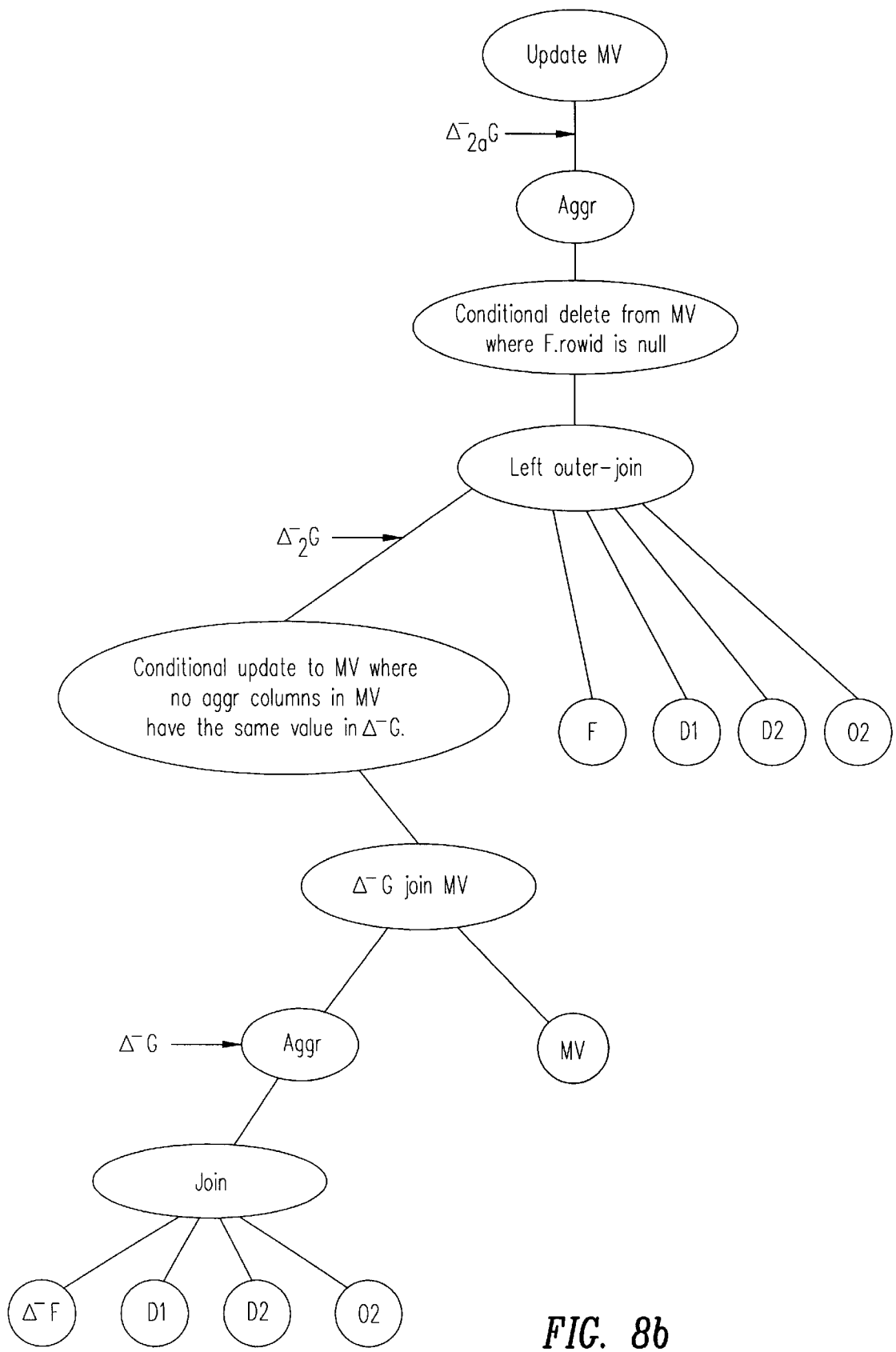
FIG. 8b is a diagrammatic view of a second delete maintenance plan.
Figure 8C:
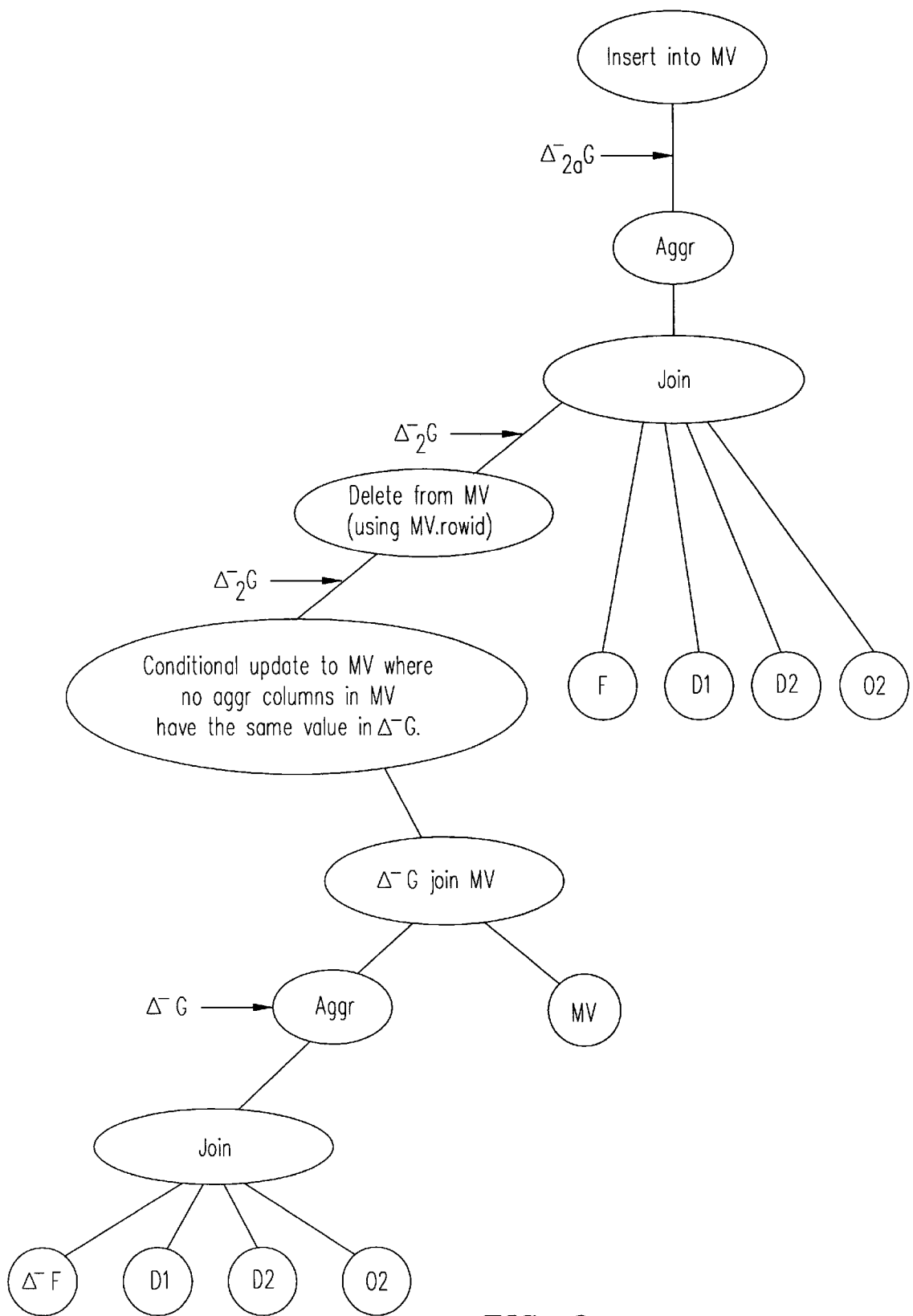
FIG. 8c is a diagrammatic view of a third delete maintenance plan.
Figure 9:
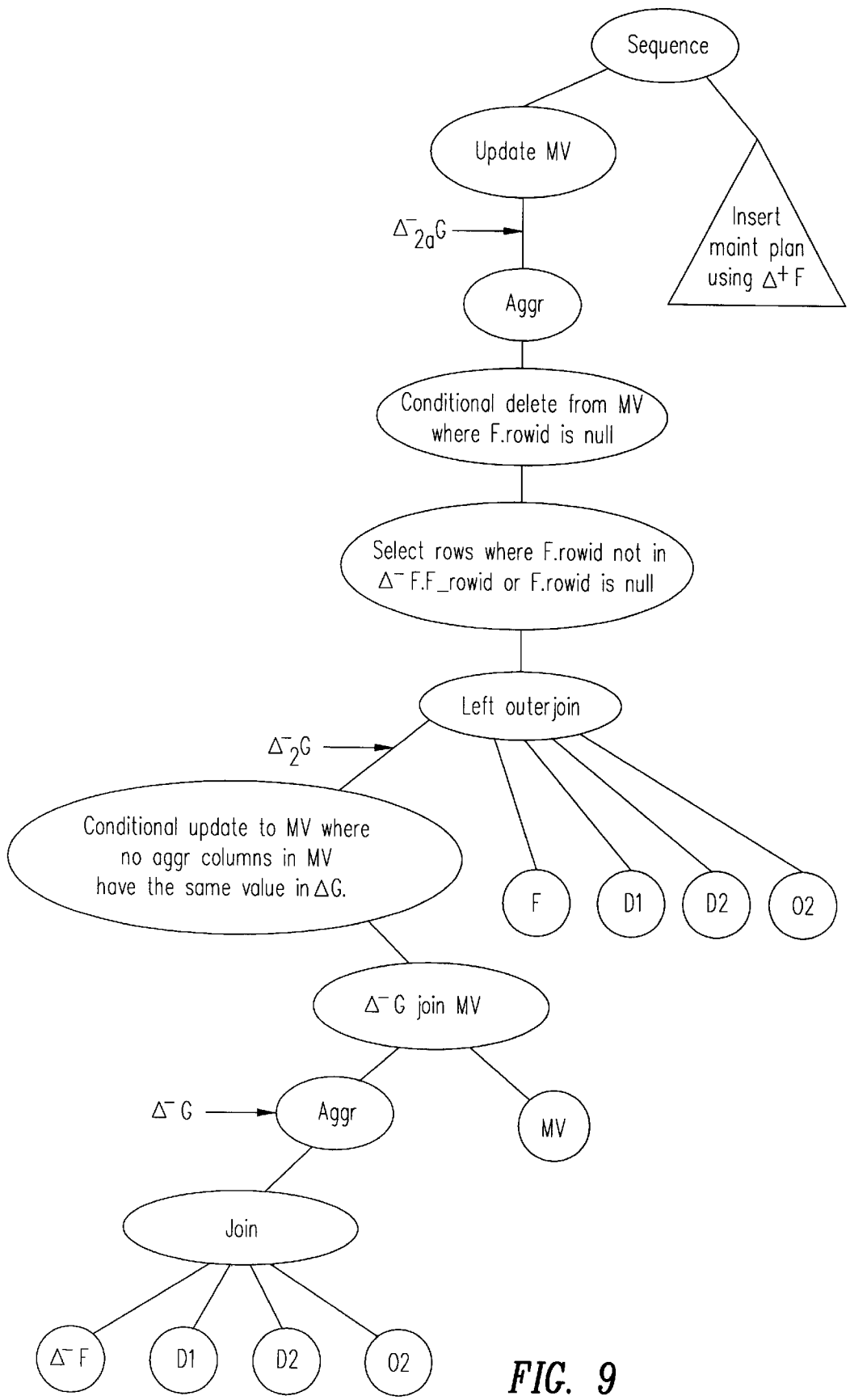
FIG. 9 is a diagrammatic view of an update maintenance plan.
Figure 10:
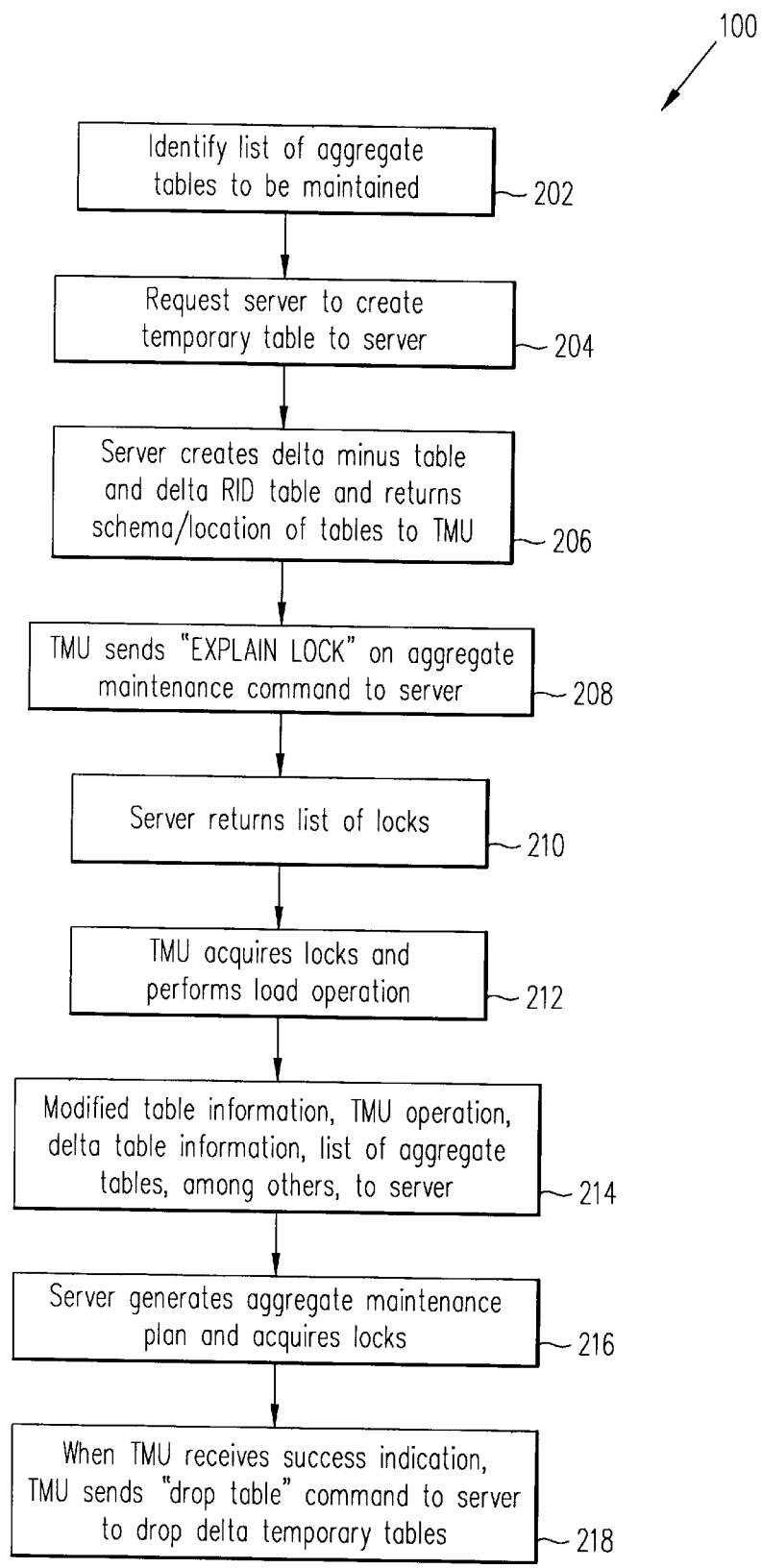
FIG. 10 is a flow diagram of a method of communicating with a database server.
Figure 11:
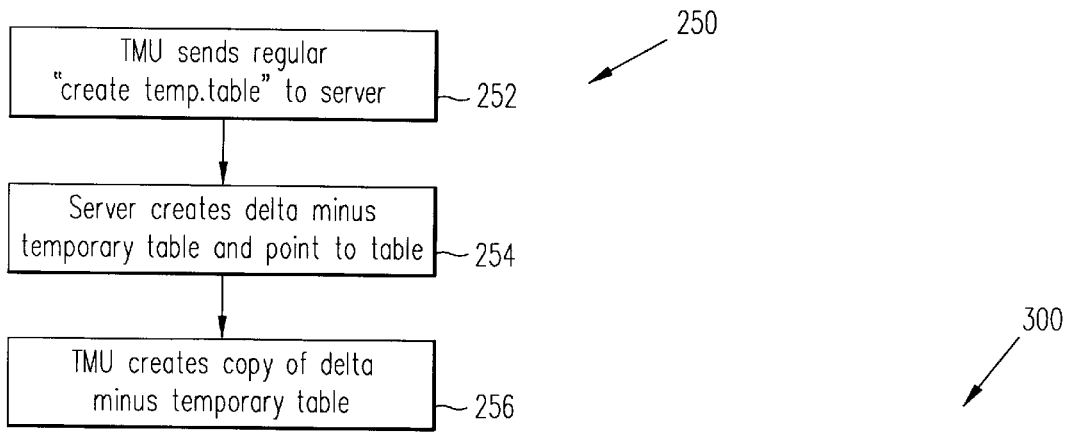
FIG. 11 is a flow diagram of a first method of creating temporary tables in a table management utility (TMU).
Figure 12:
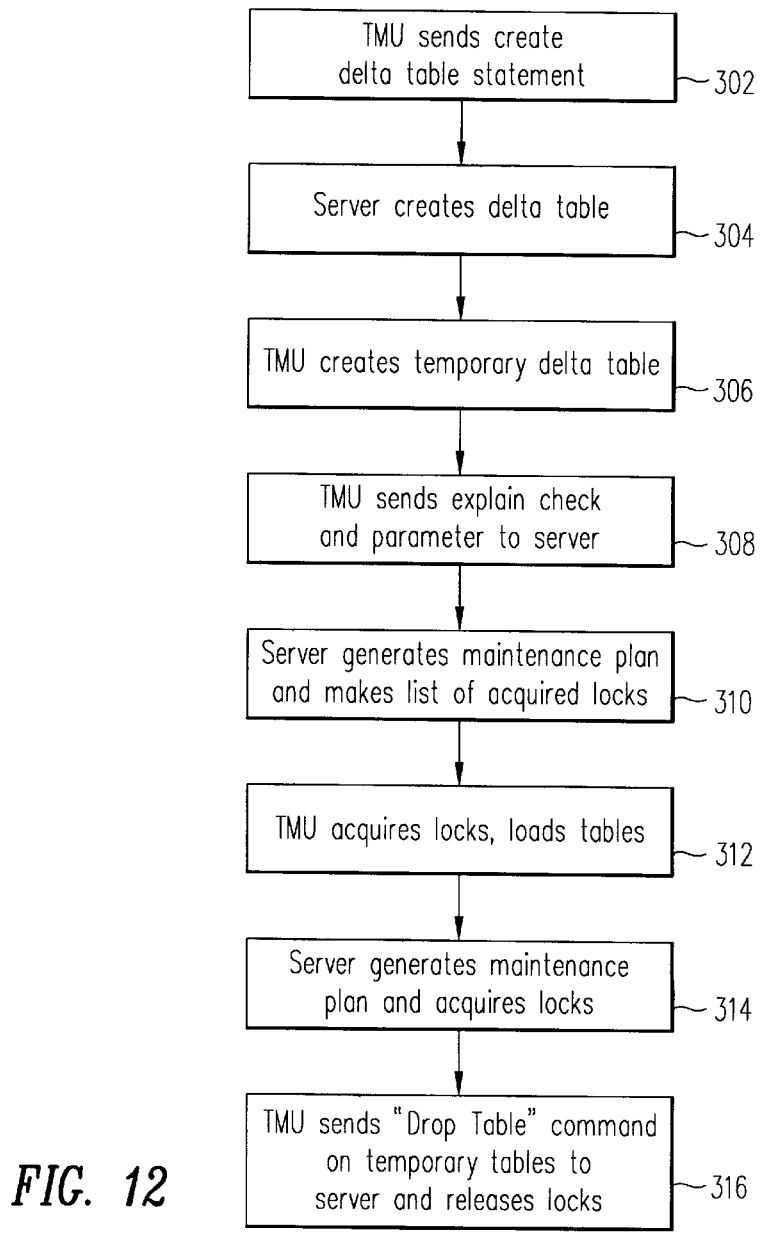
FIG. 12 is a flow diagram of a method of a second method of creating temporary tables in the TMU.

FIGS. 7–9 contain the maintenance sub-plans for insert, delete, and update, i.e., the plan for maintaining a single view MV—where MV is defined according to the schema in FIG. 6. These plans are logical-algebraic representations of the maintenance methods. FIG. 7 shows the maintenance sub-plan for maintaining an aggregate when an insert (server-based or loader-based) is performed (and the aggregates do not contain any distinct aggregates—the plan for that case can be somewhat similar to the delete plan when recomputation is required). $\Delta^+G$ is essentially produced by evaluating the view definition query with F replaced by $\Delta^+F$. $\Delta^+G$ contains new aggregation values for groups that already exist in MV and new rows that need to be inserted into MV.

The input to the (conditional) insert operation is the outer-join of $\Delta^+G$ and MV. The outer-join is done in order to preserve the rows in $\Delta^+G$ that don't join with MV, i.e., the set of rows that in $\Delta^+G$ that need to be inserted into MV. If the grouping columns in Mvare nullable columns (and not the primary key of MV), then this outer-join should be via a NULL-equivalence predicate. This means that two column values are defined as 'equal' if either 1) they have the same non-NULL value, or 2) they are both NULL. The insert is a conditional insert because the input to the insert is a superset (all of $\Delta^+G$ outer join MV) of the rows that are to be inserted. The conditional clause (where MV.rowid is null) determines the subset of the input that can be inserted into MV. The remaining rows can be passed up to the update operator. These rows can contain the rowid for the row in MV that is to be updated. The update of MV can be done using the aggregation values in $\Delta^+G$ as follows.

If MV.col denote an aggregation column in MV and $\Delta^+G$.col the corresponding column in $\Delta^+G$, the update expression is: <case when $\Delta^+G$.col is NULL then MV.col when MV.col is NULL then $\Delta^+G$.col else $\Delta^+G$.col +MV.col end> if the aggregation is SUM or COUNT and is <case when $\Delta^+G$.col is NULL then MV.col when MV.col is NULL then $\Delta^+G$.col else <case when $\Delta^+G$.col<MV.col then $\Delta^+G$.col else MV.col end>end> if the aggregation is MIN and is the same with "<" replaced by ">" if the aggregation is MAX.

The maintenance plan is a logical representation of the plan. The physical implementation of the plan may allow a merging of the outer join to MV and the conditional insert into a single physical operator (for instance, if the outer join with a B11M is performed, that functionality can be rolled into the conditional insert).

FIG. 8a shows the delete maintenance plan when the precomputed view contains count(*), sum( ) or count( ). The sub-plan of this plan, up to the computation of $\Delta^-G$ outer join MV is the same as in the plan in the insert case. The result of this plan is fed into a conditional delete operator that deletes rows in MV (using rowid values that are projected from the outer join to MV) that have the same value for the count(*) (or count of non-nullable column) aggregation as in $\Delta^-G$. The remaining rows are passed on to an update operator. The update operator also uses the MV rowids to identify the rows that are to be updated. The update logic is similar to that in the insert case except that aggregation values are subtracted instead of being summed.

FIG. 8b shows the plan for delete maintenance for the general case when count(*) optimizations are not available. The sub-plan of this plan, up to the computation of $\Delta^-G$ outer join MV, is the same as in the plan in FIG. 8a (except that the join of $\Delta^-G$ to MV can be just a join instead of an outer-join since all the rows in $\Delta^-G$ are guaranteed to join with MV—if MV was indeed in synch with the detail tables before the delete). The result of this sub-plan is then fed into a conditional update operator that updates MV based on rows in $\Delta^-G$ that have different values for all the aggregation columns than those in MV (this is essentially the subset $\Delta^-_1G$ of $\Delta^-G$. The update operation updates the aggregation values using the same logic as that described for the insert maintenance. The remaining rows ($\Delta^-_2G$) are then used to identify rows that need to be deleted from MV and those that are to be updated through recomputation. The next step then requires an outerjoin of $\Delta^-_2G$ to the detail tables. The outerjoin is required in order to preserve the rows (containing MV rowids) that need to be deleted from MV. Logically, $\Delta^-_2G$ is outer-joined (on equality of grouping column values) to the result of the join of all the detail tables. Clearly, the physical plan needs to be more efficient where the join of the detail tables uses $\Delta^-_2G$ rows to constrain dimensions before they are joined to F. One way to think of this operation is as a regular join of $\Delta^-_2G$ to the detail tables followed by an outer join back to $\Delta^-_2G$ to pick up the rows that didn't join.

For more efficient execution by leveraging starjoin, the right input of this outer join from $\Delta^-_2G$ to F, D1, D2, and O2 is similar to a starjoin where $\Delta^-_2G$ is used to constrain each of the dimension preplans (D1, and D2 through O2). Logically, this is similar to a common $\Delta^-_2G$ in each of the dimension preplans. This is similar to a common FROM clause subselect that is used to constrain multiple preliminary plans. Currently, however, the entire common subselect computation is performed once within each preliminary plan. In general, it would be preferred if this common subselect could be detected and computed only once, stored in a virtual table, then the result used within each preliminary plan. This general situation is similar to the incremental maintenance case where the system has computed the $\Delta^-_2G$ and stored it in a virtual table, and the contents of that virtual table are needed to constrain multiple preliminary plans.

One alternative is to first do a regular join of $\Delta^-_2G$ to F, D1, D2, and O2 and then do an outer-join of $\Delta^-_2G$ to the result of the regular join. The first join generates a starjoin plan, subject to changes needed for from clause subselects. Another alternative is to use the plan shown in FIG. 8c.

The result of this outer join is then input to a conditional delete operator that deletes rows from MV using MV rowids from rows that did not join to the detail tables (identified by null values for the F.rowid column). The remaining rows are then aggregated, resulting in new aggregation values for the remaining rows in MV that need to be updated. This update operation (unlike the first one) involves replacing the aggregation values in MV with the recomputed ones.

The plan shown in FIG. 8c is similar to that in 8b up to the application of the (conditional) update of MV using $\Delta^-_1G$. The delete operator above it then deletes from MV all of the $\Delta^-_2G$ groups (passed up by the conditional update) using the MV rowid column in $\Delta^-_2G$. The delete then also passes up $\Delta^-_2G$ which is then joined (not outer-joined) to F, D1, D2, and O2 and aggregated. The rows resulting from this aggregation are then inserted into MV.

FIG. 9 shows the update maintenance plan that treats updates as a set of delete followed by a set of inserts. The update plan is therefore equivalent to a delete maintenance plan using $\Delta^-F$ followed by an insert maintenance plan using $\Delta^+F$ (glued together by a sequence operator). Since a compensation is needed as the delete plan involves a version of F that has updates applied to it and not deletes, an additional select operation that selects only rows of F that weren't updated is needed. In other words, F without the updated rows is equivalent to an F that has had only the deletes applied. In order to filter out the updated rows, the rowids of the F rows that were updated need to be identified. So, $\Delta^-F$ (or $\Delta^+F$) should have an extra column containing rowids of F.

The update maintenance plan also contains the join from $\Delta^-_2G$ to the 'star' of F, D1, D2, O2, in effect constraining D1, D2, and O2, and thus the common subexpression detection needed for allowing a performant starjoin as the right input to the outer join can be required for the update maintenance plan in addition to the delete maintenance plan. Also, as in the delete case, a slightly different plan can be used where all of $\Delta hu -_2G$ is deleted first from MV and $\Delta^-_2G$ is joined (not outer joined) to MV and the recomputed groups inserted into MV.

The detail tables can be modified via a table management utility (TMU). A shared memory is used for information exchange between the TMU and the server. The shared memory is controlled by semaphore for shared access. The server posts information about completed aggregates (succeed or fail) in shared memory, and the TMU forms message to user at completion of each aggregate (either maintained or not).

As discussed below, the set of modified rows of a detail table is referred to as delta table. Generally, if the aggregate tables defined on a detail table are to be automatically maintained, TMU generates delta table for the operation and invokes the server with detail table information, suitable locks and transaction handle. Server computes and applies changes to the aggregate tables, and returns status. TMU could log and/or display the status information. Server requires that all segments of the detail table be online. The reuse of code and parallelism available with server are the reasons for invoking the server rather than implementing the aggregate maintenance functionality in TMU.

The TMU could either invalidate the aggregates or rollback the complete transaction (including all the changes to table data and index), if server returns error in maintaining aggregates. In case of non-versioned load, the aggregates would be marked invalid, if aggregate maintenance is failed.

TMU invokes communication with the server using ODBC functionality. TMU would send a command and server would return result to TMU in the form of a relational table. For every input statement, TMU would identify list of aggregate tables to be maintained (step 202). If any aggregate table is to be maintained, tmu would send "create temporary table" to server (step 204). Server would create two delta temporary tables (one as delta minus table to store pre-image rows and another as delta RID table to store rowids of modified detail table rows) and returns the schema and storage locations of those delta tables (step 206). TMU would create its own in-memory copy of delta tables as temporary table with the specified storage locations.

Next, TMU would send "EXPLAIN LOCK" on the aggregate maintenance command to server (step 208). Server would return with the list of locks required for aggregate maintenance operation (step 210). TMU would acquire the locks required for server and any additional locks for load operation (step 212). The delta tables would be inserted into during the load operation. For example, during load insert operation, rowids of the inserted rows would be inserted into RID table. During load update/ modify operation, the first pre-image row is inserted into the delta minus table, and detail table rowid and rowid in the delta minus is inserted into RID table. A hash table or bit vector on rowids of the detail table could be used to detect duplicate row modifications.

Then, TMU would send the modified table information, tmu operation performed (INSERT/APPEND/UPDATE/ MODIFY), delta table information, list of aggregate tables to be maintained, transaction handle, list of acquired locks, resource information for aggregate maintenance and a list of configuration flags (step 214). In case non-optimized load, rows with duplicate keys would be detected during insertion and thus, are not inserted into the delta table. But in case of optimized load, the duplicate key detection would be done at the end (during index merging) and thus, corresponding rows in RID need to be deleted before passing over the delta tables to server.

At the other end, server generates aggregate maintenance plan and makes sure that all the required locks have been acquired (step 216). Server marks aggregate tables as valid, as and when they are maintained. After successful completion of maintenance operation, server would return status information to TMU. TMU would send "drop table" command to server to drop the delta temporary tables (step 218).

All the communication between TMU and server would use ODBC protocol and TMU would be an ODBC application. TMU invokes the server thru ODBC Connect protocol for a tmu operation, which needs aggregate maintenance. Then onwards, the sequence of information exchange 250 takes place as follows:

1 TMU sends regular "Create Temporary Table" command with the column defi-nition of the detail table to server to create delta minus table (step 252).

2 Server would create the delta minus temporary table and return with storage locations of the table (step 254).

3 TMU would create it's own in-memory copy of delta minus temporary table with the same storage locations as that in server. Thus, both the TMU and server would have same schema and storage locations of delta table.

The above sequence of steps (1 to 3) would be repeated to create delta RID temporary table. The "Create Temporary" command can pass new value for "TEMPORARY_DATA_SEGMENT" to force server to create delta tables in "AGGREGATE_MAINT_TEMPSPACE_DIRECTORY" (step 256).

Another method 300 would be to create both the delta temporary tables in the same command (as in following step 1) as follows.

1 TMU sends the following create delta table statement. CREATE TEMPORARY DELTA TABLE ON <table being modified>(step 302).

2 Server would figure out structure of delta table and create it in the directory specified by AGGREGATE_MAINT_TEMPSPACE_DIRECTORY. It would pass the delta table schemas and storage locations back to TMU (step 304).

3 TMU would create temporary delta tables in the storage locations as specified by server (step 306).

4 TMU would send EXPLAIN LOCK, MV_MAINT DETAIL TABLE INFO, OPERATION, DELTA TABLE INFO, AGGREGATE_TAB_LIST, TRANSACTION_HANDLE, LOCKLIST, RESOURCE PARAMETERS, FLAGS; OPERATION would be one of INSERT and UPDATE. Other parameters may not be needed to generate plan and to get lock information, but it would be preferred to have this command similar to the aggregate maintenance command in step 8 (step 308).

5 Server would generate maintenance plan and makes list of required locks for maintenance of specified aggregates and sends it back to TMU (step 310).

6 TMU would acquire locks, load the detail table and delta tables. If OPTIMIZE is ON, rows with duplicate key elimination needs to delete corresponding rows in the delta tables. TMU would invalidate the aggregates in AGGREGATE_TAB_LIST, and send following aggregate maintenance command to TMU (step 312).
MV_MAINT Detail TABLE INFO, OPERATION, DELTA TABLE INFO, AGGREGATE_TAB_LIST, TRANSACTION_HANDLE, LOCKLIST, RESOURCE PARAMETERS, FLAGS. In case of load modify operation, if TMU had done only insertions into the detail table with no updates, operation passed on the above command would be INSERT.

7 Server would generate maintenance plan and makes sure that all the required locks have been acquired. It would mark aggregates valid as and when they are maintained. Server would return maintenance status information (step 316).

8 TMU would send "Drop Table" command on the temporary tables to server, release locks and print summarized status information (step 318).

Two delta temporary tables are created; One is delta minus table to store the contents of deleted (or pre-image rows in case of update) rows, and another is RowId table to store rowids of delta minus table and rowids of modified detail table rows. Delta tables would be treated as regular (temporary) tables in the server, so that aggregate maintenance plan could use regular table calls such as tabStartTableScan, tabFetchRow, tabClose and tabFetchSchemaDef calls. The function 'tabFetchSchema-Def' on delta table would return detail table column definition+ RowId of detail table (even though underlying table does not contain RowId of detail table). Similarly, tabFetchRow would hide underlying storage of delta tables and return delta minus/plus rows with rowids of the detail table. This method would help us in changing structure of delta tables, while maintaining same interface to aggregate maintenance plan.

Pseudo code for the TMU-Server Interface Communication process using the ODBC API is shown below:

SQLConnect( ) launches server
SQLExecDirect( ) is used to execute MV_MAINT command
  Asynchronous mode
    TMU calls server in ASYNCH mode
      TMU repeatedly calls SQLExecDirect( ) and reads shared memory to determine state of server
      SQLExecDirect returns SQL_STILL_EXECUTING until it is completely finished with plan
      Server sets a flag in shared memory indicating that the compile phase is complete
      TMU then does load portion and clears flag
New behavior separating compile and execute phases only used for MV_MAINT command
  Compile completes
    Server places desired locks in shared memory
  Server waits on a semaphore using WAIT_POST
  TMU aquires locks for server, placing complete lock list in shared memory
  TMU begins transaction, and places transaction handle in shared memory
  TMU completes load, and triggers the WAIT_POST
  Server checks that flag in shared memory is clear, then reads shared memory for locks and TXN
    Server uses StartChildTransaction instead of StartTransaction
    Server uses transaction handle from TMU
    Server uses lock list from TMU to mark its own lock list to emulate locking in the server
  TMU continues to call SQLExecDirect and reads shared memory during server execution
    Until server returns other than SQL_STILL_EXECUTING
      TMU reads shared memory one last time to ensure that all server messages are generated
TMU calls SQLDisconnect( ) to terminate server By this method, query performance improves, but the user's view of the database schema does not change because the user queries the same set of detail tables 46 over time. The above described automatic maintenance of precomputed views:

1. allows precomputed views to be maintained transparently and automatically within the same transaction that changes detail data without any special intervention by the user.
2. allows all supported precomputed views to be automatically maintained and under all types of changes to the detail data (i.e., inserts, deletes, and updates).
3. allows maintenance when detail data is changed either through the server or the loader and through any interface.
4. provides options for turning off automatic maintenance for all and individual views and a rebuild facility to rebuild the views from detail data at a later point in time.
5. includes a server-integrated approach for maintaining precomputed views that a) increases the scope for optimizing the maintenance strategies and b) makes the view maintenance process robust by guaranteeing data integrity.
6. contains integration and communication techniques that allow the loader and server to leverage their mutual capabilities and thus provide efficient and robust view maintenance.

Figure 13A:
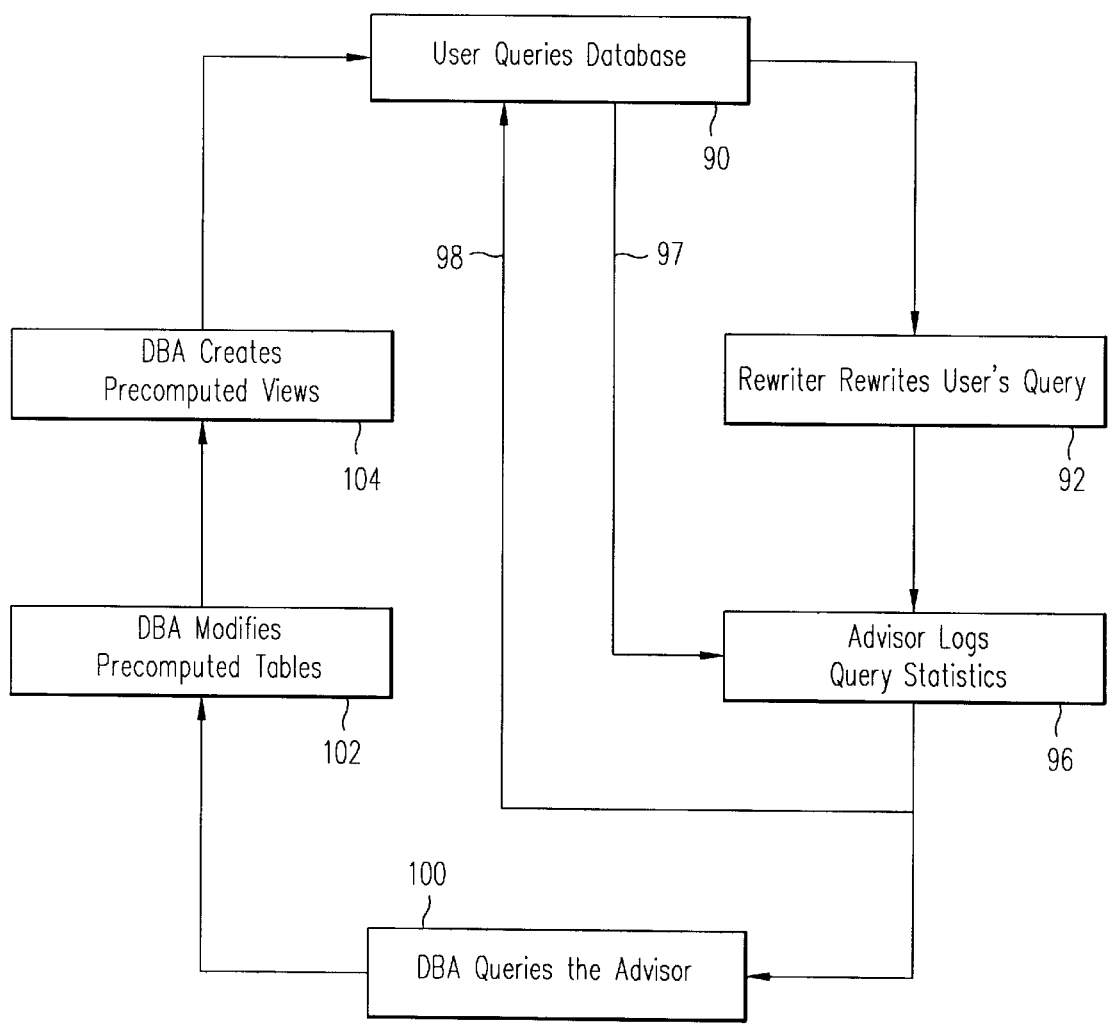
FIG. 13A is a flow diagram of a method of managing precomputed views.
Figure 13B:
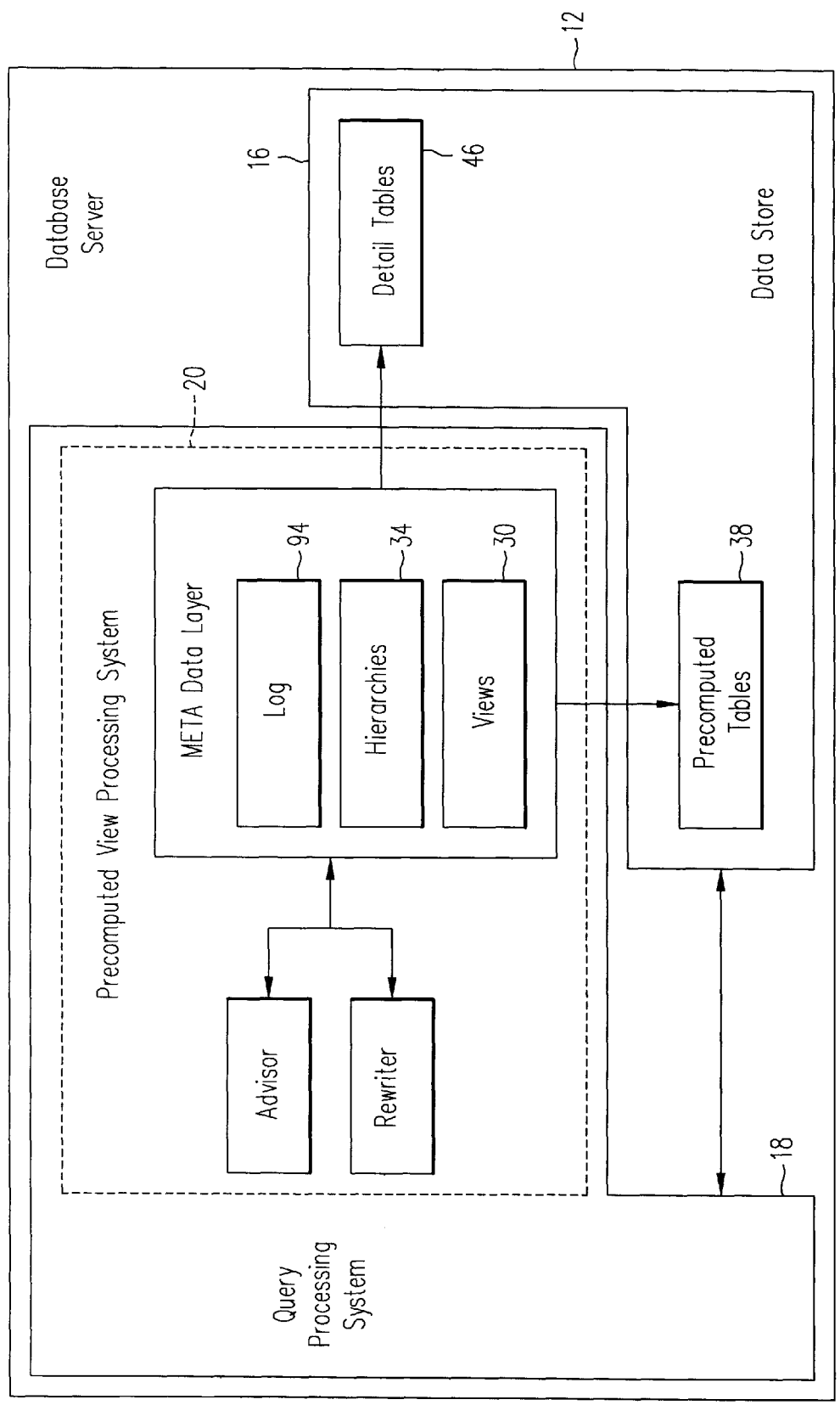
FIG. 13B is a diagrammatic view of components of the database server.

Referring to FIGS. 13A and 13B, in one embodiment, a database administrator may continuously improve the aggregation strategy used by query processing system 18 as follows. In operation, a user sends a query to database server 12 over network 14 (step 90). Initially, the database administrator may or may not have created one or more precomputed tables. If no precomputed tables have been created, the Rewriter cannot rewrite the query; instead, query processing system 18 directly accesses detail tables 46 of data store 16 to execute the query. If one or more precomputed tables have been created, the Rewriter attempts to rewrite the query using the precomputed tables (step 92). The Advisor generates (and stores in a log 94 of the Meta Data Layer) reports for queries that are rewritten by the Rewriter (step 96) and for queries that would benefit from being rewritten if the appropriate precomputed table had existed (step 97). After a period of time (represented by return loop 98), a database administrator may use the Advisor to analyze the query logs by querying the statistical reports (tables) created by the Advisor (step 100). Based on the information learned from querying the Advisor system tables, the database administrator modifies the existing precomputed table set by adding (defining and populating) new precomputed tables or by dropping existing precomputed tables (step 102). The database administrator also creates precomputed views for each of the new precomputed tables (step 104).

The invention helps the database administrator with creating and evaluating the optimal set of precomputed aggregates to satisfy a system's unique performance and space requirements. The invention enables a database administrator to tune the database's aggregate performance without affecting the way queries are submitted. In addition, all aggregate-related metadata is integrated into the database system's catalog, including intra-dimensional hierarchy relationships.

The above described system can be implemented in a high level procedural or object-oriented programming language to operate on a dedicated or embedded system. However, the programs can be implemented in assembly or machine language, if desired. In any case, the language may be a compiled or interpreted language.

Each such computer program can be stored on a storage medium or device (e.g., CD-ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

While the invention has been shown and described with reference to an embodiment thereof, those skilled in the art will understand that the above and other changes in form and detail may be made without departing from the spirit and scope of the following claims.

Other embodiments are within the scope of the claims.

What is claimed is:

1. A method for maintaining a precomputed view corresponding to detail data in a database server, comprising:

determining a maintenance plan to refresh the precomputed view when the detail data is altered;

integrating the maintenance plan with a query execution plan in the database server;

executing the query execution plan;

generating a delta table for each update operation;

sending the delta table information to the server;

acquiring locks and transaction handles associated with the update operation;

updating the precomputed view; and dropping the delta table.

2. The method of claim 1, wherein the views are maintained incrementally.

3. The method of claim 1, wherein the views are maintained by recomputing one or more detail tables.

4. The method of claim 1, wherein dependency information is used to determine a maintenance strategy.

5. The method of claim 4, wherein a query rewriter generates dependency information among views.

6. The method of claim 1, further comprising maintaining views sequentially.

7. The method of claim 1, further comprising maintaining views in parallel.

8. The method of claim 1, further comprising using one of foreign-key/primary-key relationships, hierarchy information, nullability of columns and predetermined metadata to produce a maintenance plan.

9. The method of claim 1, further comprising integrating data communication between a loader and a server to leverage their mutual capabilities in maintaining the views.

10. Computer software for maintaining a precomputed view corresponding to detail data in a database server, the computer software residing on a computer-readable medium and comprising instructions for causing a computer to perform the following operations:

determine a maintenance plan to refresh the precomputed view when the detail data is altered;

integrate the maintenance plan with a query execution plan in the database server;

execute the query execution plan;

generate a delta table for each update operation;

send the delta table information to the server;

acquire locks and transaction handles associated with the update operation;

update the precomputed view; and drop the delta table.

11. The computer software of claim 10, wherein the views are maintained incrementally.

12. The computer software of claim 10, wherein the views are maintained by recomputing one or more detail tables.

13. The computer software of claim 10, wherein dependency information is used to determine a maintenance strategy.

14. The computer software of claim 13, wherein a query rewriter generates dependency information among views.

15. The computer software of claim 10, further comprising code to maintain views sequentially.

16. The computer software of claim 10, further comprising code to maintain views in parallel.

17. The computer software of claim 10, further comprising using one of foreign-key/primary-key relationships, hierarchy information, nullability of columns and predetermined metadata to produce a maintenance plan.

18. The computer software of claim 10, further comprising integrating data communication between a loader and a server to leverage their mutual capabilities in maintaining the views.

* * * * *